United States Patent [19]
Nakata et al.

[11] Patent Number: 5,587,891
[45] Date of Patent: * Dec. 24, 1996

[54] ELECTRIC POWER CONVERTING APPARATUS

[75] Inventors: Kiyoshi Nakata, Nishiibaraki-Gun; Tokunosuke Tanamachi; Kiyoshi Nakamura, both of Katsuta; Mutsuhiro Terunuma, Mito; Masato Suzuki, Naka-Gun; Yoshio Tsutsui, Katsuta; Eiichi Toyota, Katsuta; Kouji Yasuda, Katsuta, all of Japan

[73] Assignee: Hitachi, Ltd., Tokyo, Japan

[*] Notice: The term of this patent shall not extend beyond the expiration date of Pat. No. 5,467,262.

[21] Appl. No.: 479,030

[22] Filed: Jun. 7, 1995

Related U.S. Application Data

[63] Continuation of Ser. No. 190,126, filed as PCT/JP93/00749, Jun. 3, 1993, Pat. No. 5,467,262.

[30] Foreign Application Priority Data

Jun. 4, 1992 [JP] Japan .................................. 4-143947

[51] Int. Cl.⁶ .............................................. H02M 7/5387
[52] U.S. Cl. ............................................... 363/41; 363/98
[58] Field of Search ................................ 363/41, 42, 43, 363/95, 98; 318/811; 388/811

[56] References Cited

U.S. PATENT DOCUMENTS

| | | | |
|---|---|---|---|
| 4,270,163 | 5/1981 | Baker | 363/43 |
| 4,443,841 | 4/1984 | Mikami et al. | 363/41 |
| 4,635,177 | 1/1987 | Shekhawat et al | 363/41 |
| 4,723,201 | 2/1988 | Tanamachi et al. | 363/41 |
| 4,855,893 | 8/1989 | Kratz | 363/136 |
| 5,060,129 | 10/1991 | Maruyama | 363/41 |
| 5,155,675 | 10/1992 | Maruyama et al. | 363/98 |
| 5,321,599 | 6/1994 | Tanamachi et al. | 363/41 |
| 5,361,196 | 11/1994 | Tanamachi et al. | 363/41 |
| 5,375,050 | 12/1994 | Nakata et al. | 363/41 |

FOREIGN PATENT DOCUMENTS

| | | |
|---|---|---|
| 0336019 | 4/1988 | European Pat. Off. . |
| 3105094 | 1/1982 | Germany . |
| 50-44425 | 4/1975 | Japan . |
| 52-154020 | 12/1977 | Japan . |
| 55-43998 | 3/1980 | Japan . |
| 56-74088 | 6/1981 | Japan . |
| 61-251477 | 8/1986 | Japan . |

OTHER PUBLICATIONS

"A Novel Approach to the Generation and Optimization of Three–Level PWM Wave Forms", B. Velaerts et al, PESC '88 Record, Apr. 1988, pp. 1255–1262.

"New Developments of 3–Level PWM Strategies", EPE '89 Record, 1989, pp. 411–416 Velaerts, et al.

"PWM Systems in Power Converters: An Extension of the Subharmonic Method", IEEE Trans. on Industrial Electronics and Control Instrumentation, vol. IECI–28, No. 4, Nov. 1981, pp. 315–322.

*Primary Examiner*—Peter S. Wong
*Assistant Examiner*—Shawn Riley
*Attorney, Agent, or Firm*—Antonelli, Terry, Stout & Kraus

[57] ABSTRACT

An electric power converting apparatus equipped with a 3-level PWM control in which the output voltage can be continuously and smoothly controlled from zero to a maximum voltage. The electric power converting apparatus includes a multi-pulse generating unit arranged for a dipolar modulation, a unipolar modulation, and an overmodulation; a 1-pulse generating means; and a unit for controlling the transfer operation among these modulation regions.

1 Claim, 23 Drawing Sheets

CHARACTERISTIC DIAGRAM OF SWITCHING FREQUENCY

FIG. 24

| OUTPUT MODE | | MODE P | MODE O | MODE N |
|---|---|---|---|---|
| OUTPUT STATE | | POTENTIAL OUTPUT AT HIGH POTENTIAL POINT | POTENTIAL OUTPUT AT NEUTRAL POINT | POTENTIAL OUTPUT AT LOW POTENTIAL POINT |
| CONDUCTING STATE | 70 | ON | OFF | OFF |
| | 71 | ON | ON | OFF |
| | 72 | OFF | ON | ON |
| | 73 | OFF | OFF | ON |
| OUTPUT VOLTAGE | | $+Ed/2\ (Vcp)$ | $0$ | $-Ed/2\ (-Vcn)$ |
| EQUIVALENT CIRCUIT (FOR SINGLE PHASE) | | | | |
| SW FUNCTION | Sp | 1 | 0 | 0 |
| | Sn | 0 | 0 | 1 |

ELECTRIC POWER CONVERTING APPARATUS

This is a continuation of application Ser. No. 190,126, filed as PCT/JP93/00749 Jun. 3, 1993, now U.S. Pat. No. 5,467,262.

TECHNICAL FIELD

The present invention relates to an improvement in an electric power converting apparatus for converting DC into AC and vice versa. More specifically, the present invention is related to control of an output voltage from an electric power converting apparatus.

BACKGROUND ART

A 3-level inverter produces a 3-level voltage, e.g., a high voltage, a medium voltage, and a lower voltage, by subdividing a DC power voltage (stringing voltage) into two DC voltages by way of series-connected capacitors, and selectively conducts these three leveled voltages to an inverter output terminal by turning ON/OFF the switching elements of the major circuit. The 3-level inverter has the following features.

That is, since the step number of the output voltage pulse is increased, the virtual switching frequency is increased and then an output with less distortion is obtained. Since the voltage applied to the element is reduced to approximately ½, as compared with that of the 2-level inverter, switching elements with relatively low-withstanding voltages may be utilized. Since the voltages applied to the switching elements are lowered, loss occurring in the switching elements may be reduced.

As the generating/controlling method for the output voltage pulse of the above-described 3-level inverter, the following methods have been proposed:

(1) "NEW DEVELOPMENTS OF 3-LEVEL PWM STRATEGIES" (EPE' 89 Record, 1989), page 412. In FIG. 1, there are shown a so-called "dipolar modulation" (the output voltage is produced by alternately outputting the positive/negative pulses via the zero voltage within a half period of the output voltage), a so-termed "unipolar modulation" (the output voltage is produced by outputting the pulse with a single polarity within a half period of the output voltage), and also a method for switching the above-described dipolar modulation and unipolar modulation.

(2) "PWM Systems in Power Converters: an Extension of the "Subharmonic" Method" (IEEE Transaction on Industrial Electronics and Control Instrumentation, vol. IECI-28, No. 4, November 1981), page 316. In FIG. 2(b), such a modulation method (will be referred to "overmodulation") has been proposed. That is, a half period of the output voltage is constructed of a plurality of pulses each having a single polarity, and the output voltage is produced by reducing the number of pulses in such a manner that slits among the pulses are filled up from the center portion of this half period.

(3) STUDY OF 2 AND 3-LEVEL PRECALCULATED MODULATIONS (EPE' 91 Record, 1991), page 411. In FIG. 16, the output voltage pulse generating/controlling method has been proposed for covering the output voltage from 0 to 100%.

DISCLOSURE OF INVENTION

When a 3-level inverter is employed in such usage as a railroad vehicle, various demands are made. That is, in order to realize a speed control over a wide range, a fundamental wave of an output voltage of an inverter can be continuously controlled, and also a harmonic wave of an output voltage of this inverter can be smoothly controlled from zero voltage up to a maximum voltage at which a voltage utilization factor reaches 100% (namely, a voltage region where only a single pulse is present within a half period of an output voltage, which will be referred to as a "1 pulse").

Then, in accordance with the above-described prior art (1), since a selection is made of the dipolar modulation capable of controlling a very small voltage containing a zero, the unipolar modulation means for covering the medium speed region (medium voltage), and the so-called "1 pulse" for covering the maximum voltage, the voltages from zero voltage to the maximum voltage can be outputted. The continuity of the fundamental wave can be maintained. The discontinuity happens to occur in the harmonic wave of the output voltage when the unipolar modulation is changed into the "1 pulse". Thus, there is such a problem that noises are produced due to sudden and great changes in the frequency.

In the technical idea described in the above-described prior art (2), there is another problem that the voltages from zero voltage to the maximum voltage cannot be reproduced.

On the other hand, in the above explained prior art (1), the control becomes complex in order to continuously control the fundamental wave of the output voltage, since the pulse data corresponding to the phase and the voltage of the fundamental wave are stored in the memory, and the pulse series corresponding to the respective modulations is outputted based upon the pulse data. Furthermore, in the unipolar modulation according to the above-described prior art (3), since this modulation corresponds to a modulation method for changing the number of pulses present in the half period of the fundamental wave, complex controls are required.

In addition, there is another problem in the above-described prior art such that when the modulation methods and the pulse number are changed, unpleasant discontinuous sounds are produced.

An object of the present invention is to realize a 3-level pulse generation control in such a manner that an output voltage of a 3-level inverter can be controlled from zero to a maximum value, and the output voltage of the inverter can be continuously and smoothly controlled.

Another object of the present invention is to simplify a control of an inverter.

Another object of the present invention is to prevent discontinuous sounds in an electric vehicle mounting an inverter.

The above-described objects may be achieved by an electric power converting apparatus equipped with an electric power converter for converting a DC voltage into AC phase voltages having 3-leveled potentials, and a motor driven by this electric power converter. The electric power converting apparatus comprises:

a dipolar modulation mode for producing a series of output pulses such that a half period of a fundamental wave of an output phase voltage of this electric power converter is represented by a pulse series having a zero potential between a positive pulse and a negative pulse;

a unipolar modulation mode for producing a series of output pulses such that a half period of a fundamental wave of an output phase voltage of said electric power converter is represented by a pulse series constructed of a plurality of single polarity pulses;

an overmodulation mode for producing a series of output pulses such that a half period of a fundamental wave of an output phase voltage of the electric power converter is represented by reducing the number of pulses in such a manner that a slit between the pulses is filled up from a center of a pulse train constructed of a plurality of single polarity pulses;

a 1 pulse mode for producing an output pulse such that a half period of a fundamental wave of an output phase voltage of the electric power converter is represented by a single pulse having the same polarity; and a means for changing the modulation mode among the dipolar modulation mode, unipolar modulation mode, overmodulation mode and 1 pulse mode.

The above-described objects of the present invention are achieved by an electric power converting apparatus equipped with an electric power converter for converting a DC voltage into AC phase voltages having more than 2 levels of potential, and a motor driven by this electric power converter. This electric power converting apparatus comprises:

first pulse generating means for generating pulses under an asynchronous condition with a fundamental wave of an output voltage from the electric power converter, thereby outputting a plurality of pulses at a half period of an output phase voltage; and second pulse generating means for generating at the electric power converter a single pulse having the same polarity as that of the fundamental wave of the voltage outputted from the electric power converter within a half period of the output phase voltage in synchronism with this fundamental wave of the output voltage.

Furthermore, the above-described of the present invention are achieved by a control apparatus for an electric vehicle equipped with an inverter for outputting a variable AC voltage with a variable frequency, and an induction motor driven by this inverter. This control apparatus comprises:

control means for continuously changing a switching frequency of the inverter within all regions that there are plural pulses within a half period of the fundamental wave of an output voltage from the inverter.

In the 3-level inverter, since the dipolar modulation is mainly employed as the low-voltage control, the unipolar modulation is employed as the medium-voltage control, and the overmodulation is utilized as the high-voltage control for transferring the modulation between the unipolar modulation and the 1 pulse, the output voltage is continuously changed from zero to the maximum voltage.

Also, since the above-explained first modulation means can produce the output pulses irrelevant to the frequency of the inverter, the structure of the first modulation means for producing the pulses can be made simple.

Furthermore, since control means is employed which continuously varies the switching frequency of the inverter, the higher harmonics of the output voltage are substantially continuously changed, so that a discontinuous change in tone is reduced.

BRIEF DESCRIPTION OF DRAWINGS

FIG. 24 is an explanatory diagram for effectively explaining a basic operation of a U-phase switching unit.

BEST MODE FOR CARRYING OUT THE INVENTION

After the present invention is summarized with reference to FIGS. 1 to 3 and FIG. 24, a preferred embodiment of this invention will be explained with reference to FIG. 1 and FIGS. 4 to 13.

A 3-level inverter (also referred to an "NPC inverter") produces 3 different levels of voltages, i.e., a high potential, a medium potential and a low potential, by dividing a DC power source voltage (catenary voltage in the case of an electric vehicle) into two DC voltages by employing series-connected capacitors, and selectively conducts these 3-level voltages to an output terminal of the 3-level inverter by turning ON/OFF switching elements of a main circuit.

Figure 1:
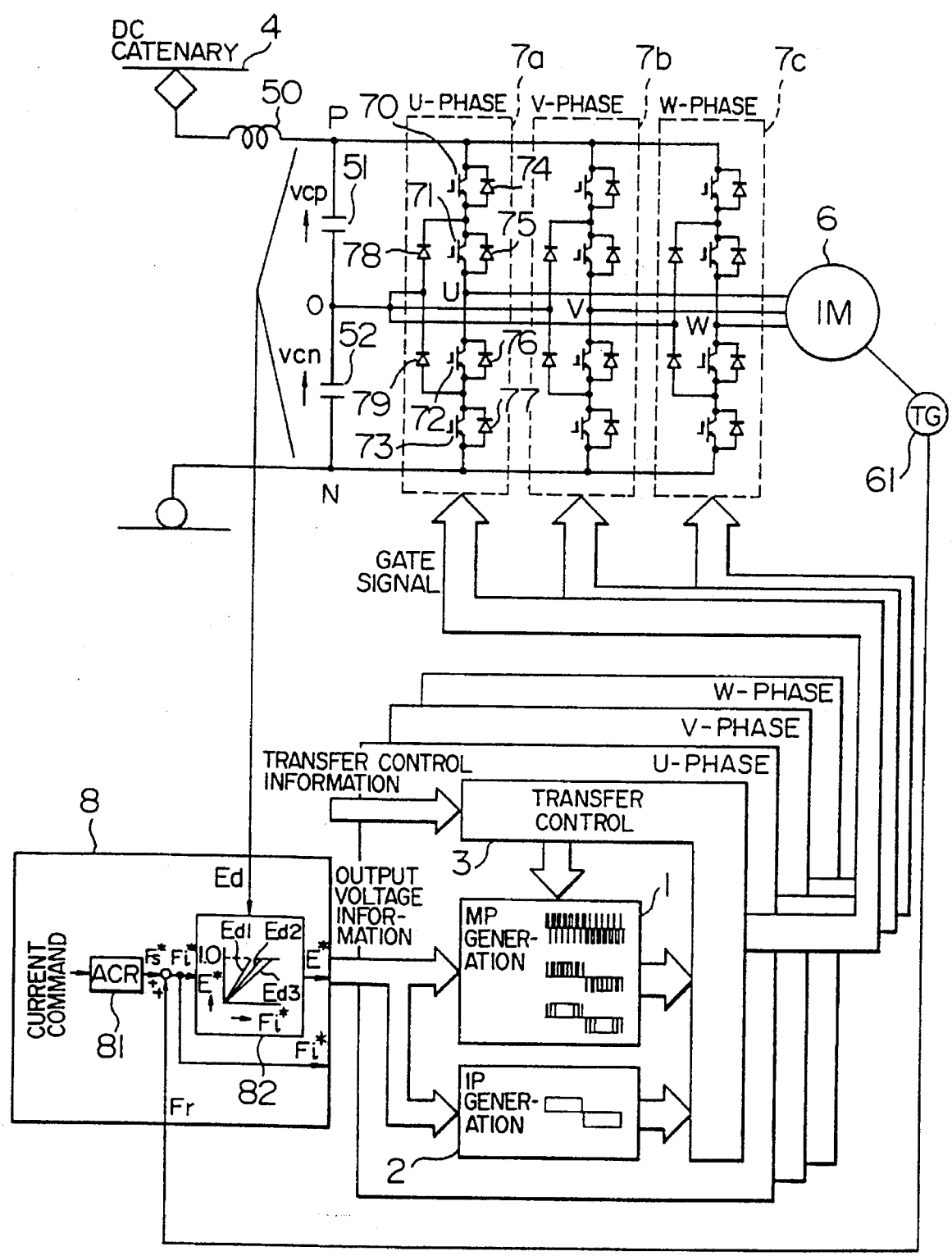
FIG. 1 is a schematic diagram for showing an arrangement of an electric power converting apparatus according to a preferred embodiment of the present invention.

In FIG. 1, there is shown as an example of this main circuit arrangement, a basic arrangement (in case of 3 phases) when this main circuit is applied to an electric vehicle of a railroad.

In FIG. 1, reference numeral 4 indicates a DC catenary functioning, numeral 50 shows a DC reactor, and reference numerals 51 and 52 denote clamp capacitors separately arranged and for producing an intermediate potential point "0" (will be referred to a "neutral point") from the voltage of the DC voltage source 4. Furthermore, reference numerals 7a, 7b and 7c denote switching units arranged by a self-commutation switching element, and selectively outputting a voltage at a high potential point (P-point voltage), a neutral point voltage (O-point voltage), and a voltage at a low potential point (N-point voltage) in response to a gate signal supplied to this switching element. In this case, the switching unit 7a is constituted by self-commutation switching elements 70 to 73 (although IGBT is employed, GTO, transistor and the like may be employed), flywheel rectifier elements 74 to 77, and auxiliary rectifier elements 78 and 79. An induction motor 6 is used as a load. The remaining switching units 7b and 7c have the same arrangements as that of the switching unit 7a.

First, basic operation of the U-phase switching unit 7a will be described with reference to FIG. 24.

It should be understood that voltages "Vcp" and "Vcn" appearing at the clamp capacitors 51 and 52 are completely smoothed DC voltages equal to a divided voltage of "Ed/2", and the neutral point (O-point) is virtually grounded. Also, an output voltage indicates a phase voltage outputted from the inverter unless another specific indication is made.

The switching elements 70 to 73 for constituting the switching unit 7a are turned ON/OFF in accordance with 3 different conducting patterns as shown in FIG. 24. In other words, in the output mode P such that the potential appearing at the point P at the DC voltage side is outputted, the switching elements 70 and 71 are turned ON and the switching elements 72 and 73 are turned OFF so that the output voltage becomes Ed/2. In an output mode O such that the potential appearing at the neutral point is outputted, the switching elements 71 and 72 are turned ON, and the switching elements 70 and 73 are turned OFF, so that a zero potential is outputted as the output voltage. In an output mode N such that the potential appearing at the point N is outputted, the switching elements 70 and 71 are turned OFF, and the switching elements 72 and 73 are turned ON, so that the output voltage becomes-Ed/2.

In FIG. 24, there are shown equivalent circuits of single-phase main circuits (switching unit and clamp capacitor) for the respective output modes. Assuming now that switching functions Sp and Sn for representing the conducting states of the switching elements by two values of "1" and "0" are employed, in case of the output mode P, it may be expressed as Sp=1 and Sn=0;

in case of the output mode O, it may be expressed as Sp=0 and Sn=0; and in case of the output mode N, it may be expressed as Sp=0 and Sn=1. At this time, a relationship between the switching functions Sp, Sn and the gate signals Gpu, Gpx, Gnx, Gnu (it is assumed that an OFF signal is 0 and an ON signal is 1) supplied to the switching elements 70, 71, 72, 73, may be expressed by the following formula:

$$\begin{cases} Gpu = Spu \\ Gpx = \overline{Snu} \\ Gnx = \overline{Spu} \\ Gnu = Snu \end{cases} \quad \text{Eq. 1}$$

As a consequence, the conducting states of the switching elements may be determined by preparing two switching functions Sp and Sn for the respective phases. These switching functions Sp and Sn are determined in such a manner that the output voltage "eu" becomes a sinusoidal form by pulse width modulation (PWM) control.

It should be noted that the main circuits of the 3-level inverter are described more in detail in JP-A-51-47848 and JP-A-56-74088.

Figure 2:
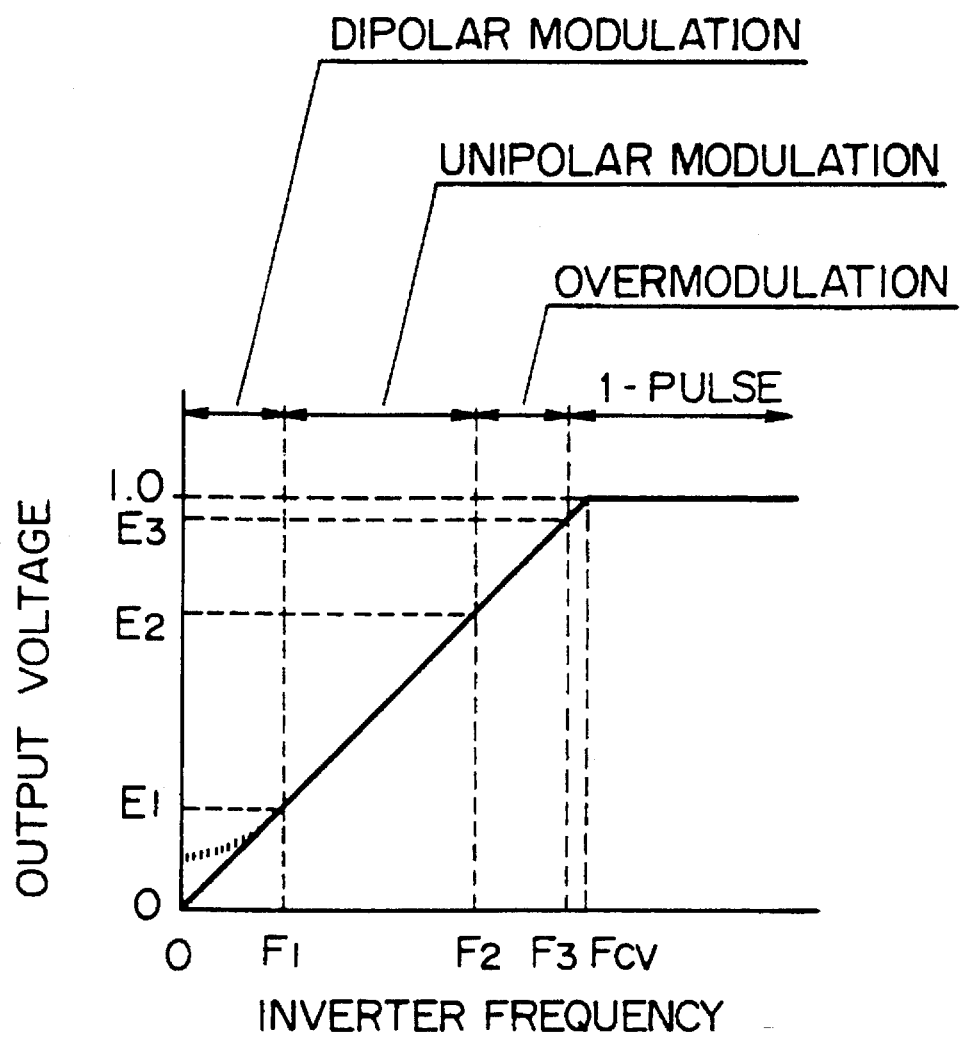
FIG. 2 is an explanatory diagram for explaining a relationship between an output voltage characteristic and a PWM mode.

On the other hand, when a speed control is performed over a wide range from a variable voltage/variable frequency (VVVF) range to a constant voltage/variable frequency (CVVF) range under such a limited power source voltage as an electric car, an output voltage characteristic as shown by a solid line of FIG. 2 is required. That is to say, a high-speed drive is realized in such a manner that in a low-speed region, since the output voltage is adjusted substantially proportional to the inverter frequency (this region will be referred to as "VVVF control region"), magnetic flux within the motor is maintained substantially constant, and predetermined torque is maintained, whereas in a high-speed region, since the inverter frequency is continuously increased while the maximum output voltage of the inverter is maintained (this region will be referred to as "CVVF control region"), the voltage utilization factor is made maximum under the limited voltage.

However, in accordance with the conventionally known unipolar modulation method, in such a region (located near the starting point of the VVVF control region) that the inverter frequency becomes low and the control of the very small output voltage is demanded, a voltage pulse smaller than the minimum output pulse width which is determined by the minimum ON-time of the switching element cannot be realized, but as indicated by a dot line of FIG. 2, a voltage larger than the commanded voltage is outputted.

For instance, considering now that all of voltage pulses outputted from the inverter have minimum pulse widths determined by the minimum ON-time "Ton" of the switching element, a root-mean-square value "E" of the output voltage at this time is given as follows:

$$E=2FcTonEmax \quad \text{Eq. 2}$$

where Fc is carrier frequency.

Then, any voltages smaller than this output voltage cannot be controlled. It should be noted that symbol "Emax" indicates a root-mean-square value of a rectangular voltage with the-conducting angle of 180°. This root-mean-square value "Emax" is given by the following equation (3):

$$Emax = (\sqrt{2}/\pi)Ed \quad \text{Eq. 3}$$

Also, the maximum output voltage of the 3-level inverter is substantially coincident with this value "Emax".

In accordance with the above-described equation (2), when Fc=500 Hz and Ton=100 microseconds, E=0.1 E max. In this case, it should be understood that no control is made to such a voltage equal to, or lower than 10% of the maximum output voltage Emax. As a result, there is a problem that the lower limit controllable of the controllable output voltage controllable only by the unipolar modulation is limited, and thus it is difficult to continuously control the voltage.

To solve this problem, although the dipolar modulation (dipolar mode) is effective, specific care should be taken in the prior art when the modulation mode is transferred from this dipolar modulation to the unipolar modulation (unipolar mode).

On the other hand, the maximum voltage "E" which can be produced in the unipolar modulation, is expressed at a limit point (modulation factor A=1) of an ideal sinusoidal modulation:

$$E=(\pi/4)Emax \approx 0.785 Emax \qquad \text{Eq. 4}$$

Considering the minimum OFF-time Toff of the switching element, this maximum voltage "E" is expressed as follows:

$$E=(\pi/4)(1-FcToff)Emax \qquad \text{Eq. 5}$$

where Fc is a carrier frequency.

For instance, if Fc=500 Hz and Toff=200 microseconds, then E=0.707 Emax. In this case, it implies that approximately only 70% of the maximum output voltage Emax cannot be covered. Assuming that the pulse width of the 1-pulse mode cannot be adjusted, the fundamental wave becomes discontinuous. On the other hand, assuming that the pulse width of the 1-pulse mode can be adjusted, since continuity is maintained by reducing the pulse width, continuity of the higher harmonics is deteriorated.

Various modulation methods for covering this voltage range may be considered. The overmodulation (overmodulation mode) is the most effective modulation method in view of easy control for pulse generation, matching (conformability) characteristic with the unipolar modulation, continuity of high harmonics contained in the output voltage, and the like. In accordance with the overmodulation region, the slits with narrow widths among the pulses at the center portion of the voltage pulse train (around a peak value of an instantaneous value for a fundamental wave) within a half period of an output voltage are gradually filled, so that the output voltage may be enlarged near the 1 pulse.

In such a region that a modulation factor becomes extremely large, namely the overmodulation control is limited, the modulation mode is transferred to a so-called "1-pulse mode" where only 1 pulse is present at a half period of output voltage, and output voltage at this time reaches substantially "Emax". However, under such a circumstance, since the transfer timing from the overmodulation to the 1-pulse, or from the 1-pulse to the overmodulation, depends upon the modulation factor and the carrier frequency, this transfer timing cannot be arbitrarily set. If a hysteresis is provided among them, then the continuity of the fundamental voltage wave would be deteriorated.

Thus, the control mode is transferred from the overmodulation control to the 1-pulse control capable of controlling the voltage by the pulse width control, which is not an extension of the overmodulation control (namely, production of 1-pulse mode where the modulation factor is not made infinite). As a result, the mode transfer operation is possible at a preselected timing between the overmodulation control and the 1-pulse control, and thus the continuous transfer of the fundamental wave wave can be realized.

A series of these transfer controls (dipolar modulation, unipolar modulation, overmodulation, 1-pulse modulation) are continuously performed, so that the output voltages from zero voltage to the maximum voltage can be obtained under stable condition and high precision, while selecting the pulse mode (modulation mode) corresponding to the required output voltage.

That is to say, as represented in FIG. 2, when the induction motor 6 is controlled under such a condition that V/F= constant, the dipolar modulation is employed from the initiating stage up to the inverter frequency of F1. Then, this dipolar modulation is changed into the unipolar modulation range when the inverter frequency reaches F1. When the inverter frequency reaches F2, the operation mode is transferred to the overmodulation range. Furthermore, when the inverter frequency reaches F3, the operation mode is transferred to the 1-pulse region.

Figure 3:
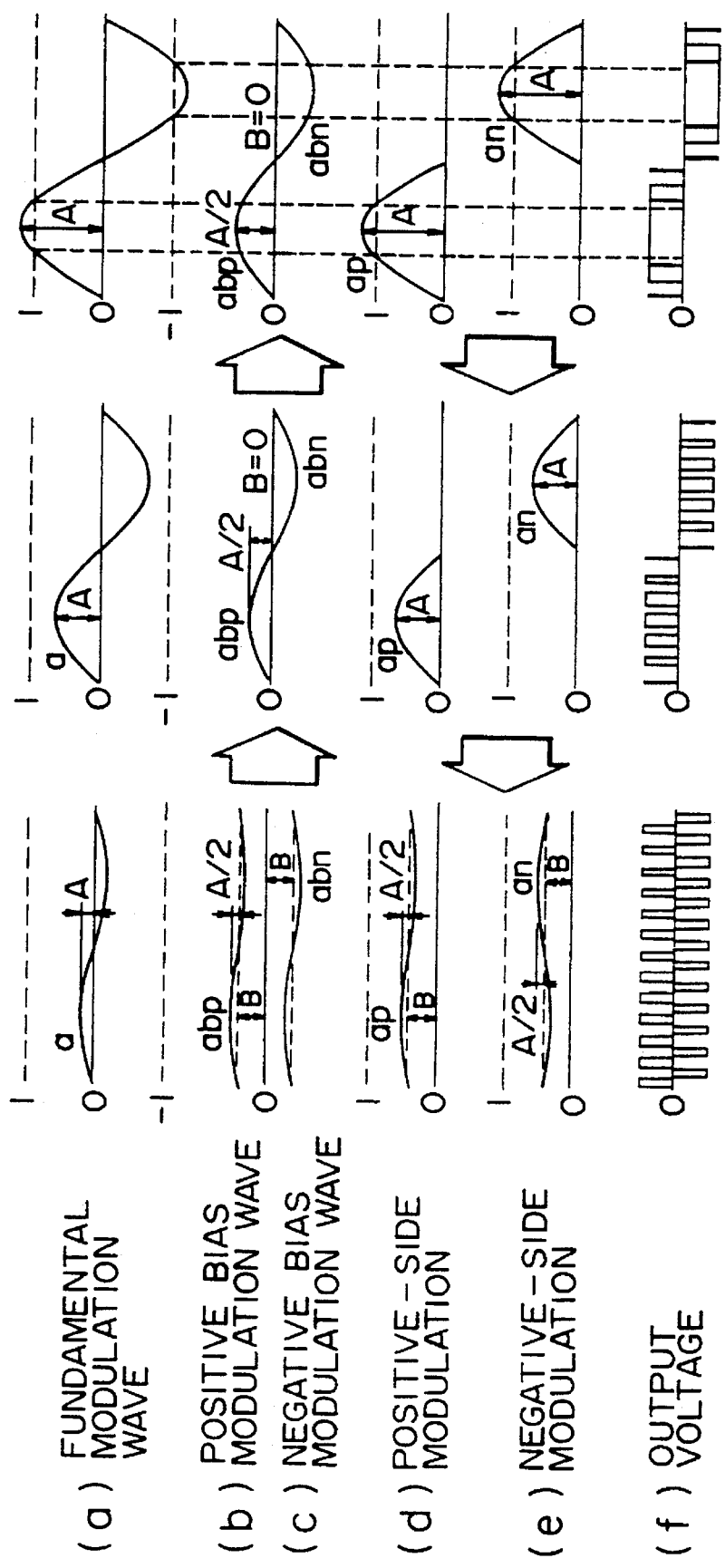
FIG. 3 is an explanatory diagram for explaining modulation waveforms used to continuously transfer the PWM modes at a multiple pulse region.

One example of a modulation wave capable of realizing the above-described idea based upon the unified voltage command is represented in FIG. 3.

A fundamental modulation wave "a", which is proportional to a fundamental wave component of an output voltage, will be produced based upon both an inverter frequency command Fi* derived from the current controlling means at the host side and an output voltage command E* derived therefrom;

$$a = A \sin \theta \qquad \text{Eq. 6}$$

where A: modulation factor, t: time, θ=phase

Here, the modulation factor "A" (0≧A≧1) in the sinusoidal modulation region is given by the following equation:

$$A = 2\sqrt{2} \; E^*Emax/Ed \qquad \text{Eq. 7}$$

This fundamental modulation wave "a" is identical to that of the dipolar modulation and of the unipolar modulation, and similarly that of the overmodulation except for the calculation method of the modulation factor "A" (will be explained later).

To make it possible to continuously transfer the modulation mode between the dipolar modulation and the unipolar modulation, a positive bias modulation wave "a bp" and a negative bias modulation wave "a bn", which are expressed by the following equations, are provided in this case:

$$\begin{cases} a\,bp = a/2 + B \\ a\,bn = a/2 - B \end{cases} \qquad \text{Eq. 8}$$

Under the dipolar modulation control, the above-described positive/negative bias modulation waves "a bp" and "a bn" directly become a positive-side modulation wave "ap" and a negative-side modulation wave "an".

$$\begin{cases} a\,p = a\,bp \\ a\,n = -a\,bn \end{cases} \qquad \text{Eq. 9}$$

It should be noted in this case that both of the positive side modulation "a p" and the negative side modulation "a n" are set to be positive in order to simplify the formation of the switching functions Sp and Sn. Eventually the pulse width of the output voltage is set in such a manner that this pulse width is directly proportional to the amplitudes of the positive-side/negative-side modulation waves "a p" and "a n". In the case of dipolar modulation, the control operation is carried out by shifting the positive pulse and the negative pulse by approximately 180°, respectively.

In the above-described equation (8), when B=0, it becomes the unipolar modulation. At this time, the positive bias modulation wave "a bp" is overlapped with the negative bias modulation wave "abn", as illustrated in FIG. 3 (ii). Thus, the produced positive/negative modulation waves "a p" and "a n" are given as follows:

$$ap = \begin{cases} a\,bp + a\,bn = A\sin\theta & (a > 0) \\ 0 & (a \leq 0) \end{cases} \quad \text{Eq. 10}$$

$$an = \begin{cases} 0 & (a \geq 0) \\ -(a\,bp + a\,bn) = -A\sin\theta & (a < 0) \end{cases} \quad \text{Eq. 11}$$

In the case that the minimum OFF time of the switching element is negligibly short, when the instantaneous value of the negative modulation wave "a n" is greater than, or equal to 1, the maximum pulse is outputted (overmodulation will be described).

It is unstandable that the setting of bias "B" is very important in the transfer control. Based on the value of B, the transfer control between the dipolar modulation region and the unipolar modulation region may be realized;

(a) when $A/2 \leq B < 0.5$, it becomes the dipolar modulation.

(b) when B=0, it becomes the unipolar modulation.

For example, under B=0.5, two elements of the upper arm are switched at the same time, and two elements of the lower arm are switched at the same time, which will become so-called "2-level inverter (no period during which the potential at the neutral point is outputted)". Also, under B>0.5, a period is present during which all of series-connected 4 elements are turned ON. Since this period may cause the power source to be shortcircuited, this period must be prohibited.

On the other hand, in accordance with the overmodulation control, the modulation factor A is increased up to 1 or more than 1, and the slits (namely, zero voltage output period) among the pulses of the output voltage around the center portion of a half period of this output voltage are suppressed, so that the output voltage is improved.

In the case where the voltage command is further raised, the overmodulation mode gives way to the 1 pulse mode. Such operation will be explained in the following embodiment.

As described above, the dipolar modulation, unipolar modulation and overmodulation can be realized based on the unified voltage command, and thus the continuous transfer control can be achieved until the 1 pulse modulation control, being the maximum output.

An arrangement of an electric power converting apparatus according to a preferred embodiment of the invention, which can realize the above-described idea, will now be explained.

FIG. 1 schematically shows an example of a pulse width modulating apparatus for controlling the above-explained switching unit to output AC voltages having 3-level potentials.

In FIG. 1, reference numeral 1 denotes a multi-pulse generating means for outputting a dipolar modulation waveform, a unipolar modulation waveform, or an overmodulation waveform in accordance with output voltage relation information and transfer control information; reference numeral 2 shows a 1-pulse generating means for outputting a 1-pulse waveform in accordance with the output voltage relation information (1-pulse mode); and reference numeral 3 indicates a transfer controlling means for continuously transferring the respective PWM modes. A gate signal corresponding to the output of the transfer controlling means 3 is supplied via a gate amplifier (not shown) to the switching elements in the switching unit for the respective phases, so that ON/OFF controls are performed. The pulse width modulating means constructed of these multi-pulse generating means 1, 1 pulse generating means 2 and transfer controlling means 3 is a characterizing part of the present invention.

It should be noted in this example that the voltage relation information fetched by the pulse width modulating means is given from a host-side current controlling means 8. This current controlling means 8 produces a slip frequency command Fs* (produced by deviation between the current instruction value and the real motor current) of the induction motor 6 by current adjusting means 81. Furthermore, the current controlling means 8 produces an inverter frequency command Fi* by adding the above-described slip frequency command Fs* to a rotation frequency Fr of the induction motor detected by a rotation frequency detecting means 61 mounted on the induction motor 6.

In addition, based upon both of this inverter frequency command Fi* and the DC voltage Ed (i.e., voltage across P and N, corresponding to a summation of the "Vcp+Vcn" voltages across the clamp capacitors 51, 52) of the 3-level inverter, an output voltage setting means 82 produces an output voltage command E*.

The output voltage setting means 82 the inclination when the DC voltage Ed is low (Ed=Ed1), and decreases the inclination when the DC voltage Ed is high (Ed=Ed3), so that the output voltage can continuously satisfy the demands. As a result, the output voltage characteristic as shown in FIG. 2 is realized. These current controlling means may output instantaneous values of the output voltage.

Referring now to FIGS. 4 to 11, an arrangement and an operation of the above-described pulse width modulating means will be described more in detail.

Figure 4:
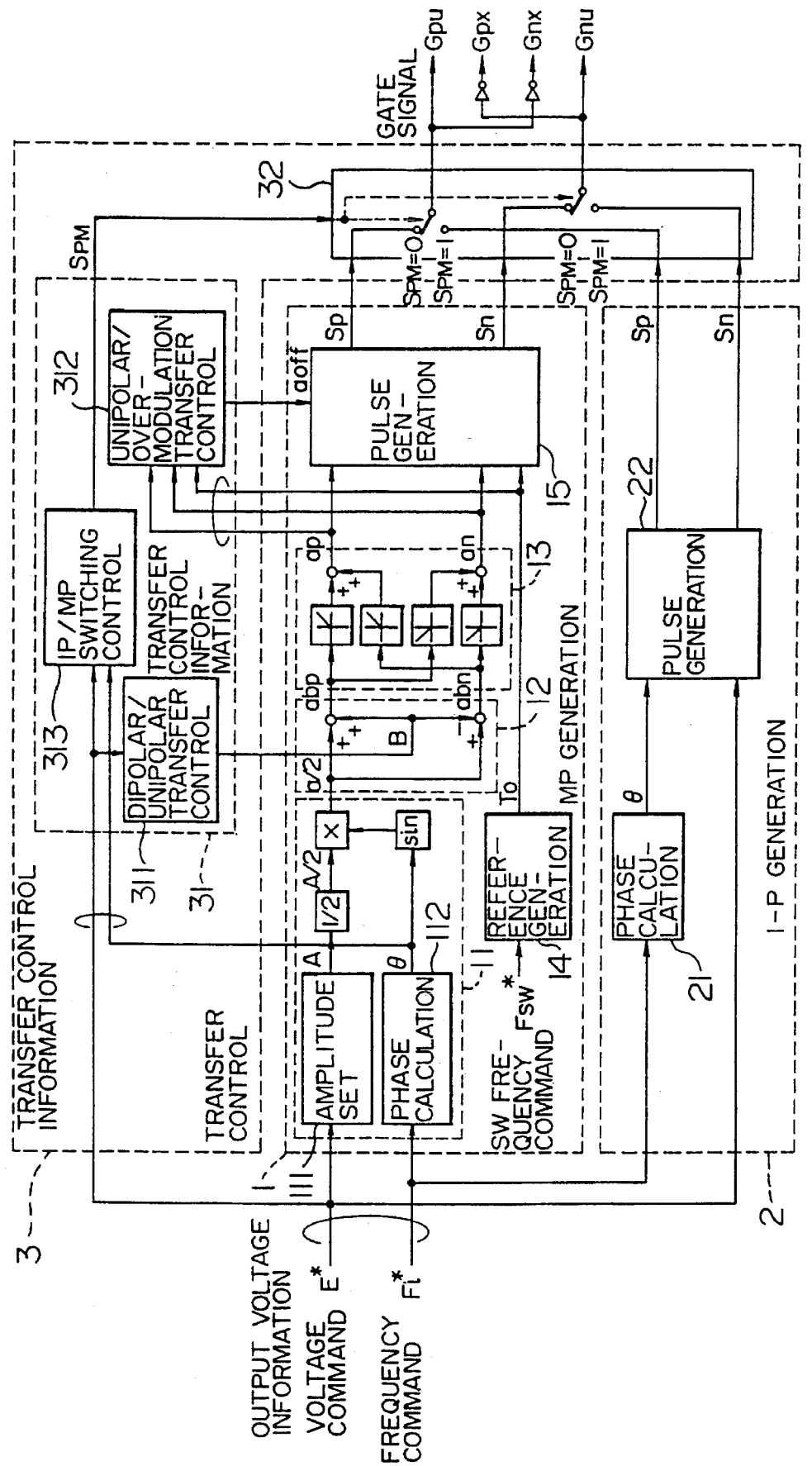
FIG. 4 schematically shows a detailed construction of the electric power converting apparatus shown in FIG. 1.

In FIG. 4, there is shown an example of an overall arrangement of the pulse width modulating means. In this drawing, the multi-pulse generating means 1 is constructed of a fundamental modulation wave generating means 11, a bias superimposing means 12, a positive/negative distributing means 13, a reference signal generating means 14 and a pulse generating means 15.

The fundamental modulation wave generating means 11 calculates a phase "θ" by temporal-integrating the inverter frequency command Fi* received as the output voltage relation information, in a phase calculating means 112, thereby obtaining a sinusoidal value "sin θ" at this phase θ. On the other hand, amplitude "A" (modulation factor A=4/πE*) of the fundamental modulation wave is calculated by an amplitude setting means 111 from the voltage command E* of the output voltage relation information. After the resultant amplitude "A" is divided by ½, the divided amplitude is multiplied by sin θ to produce an instantaneous fundamental modulation wave a/2 having a half of the amplitude "A", which will then be outputted. The bias superimposing means 12 adds and subtracts a bias "B", derived from the multi-pulse transfer controlling means 31 of the transfer controlling means 3, to/from this a/2, so that two sets of positive/negative bias modulation waves "a bp" and "a bn" are produced and outputted.

Figure 5:
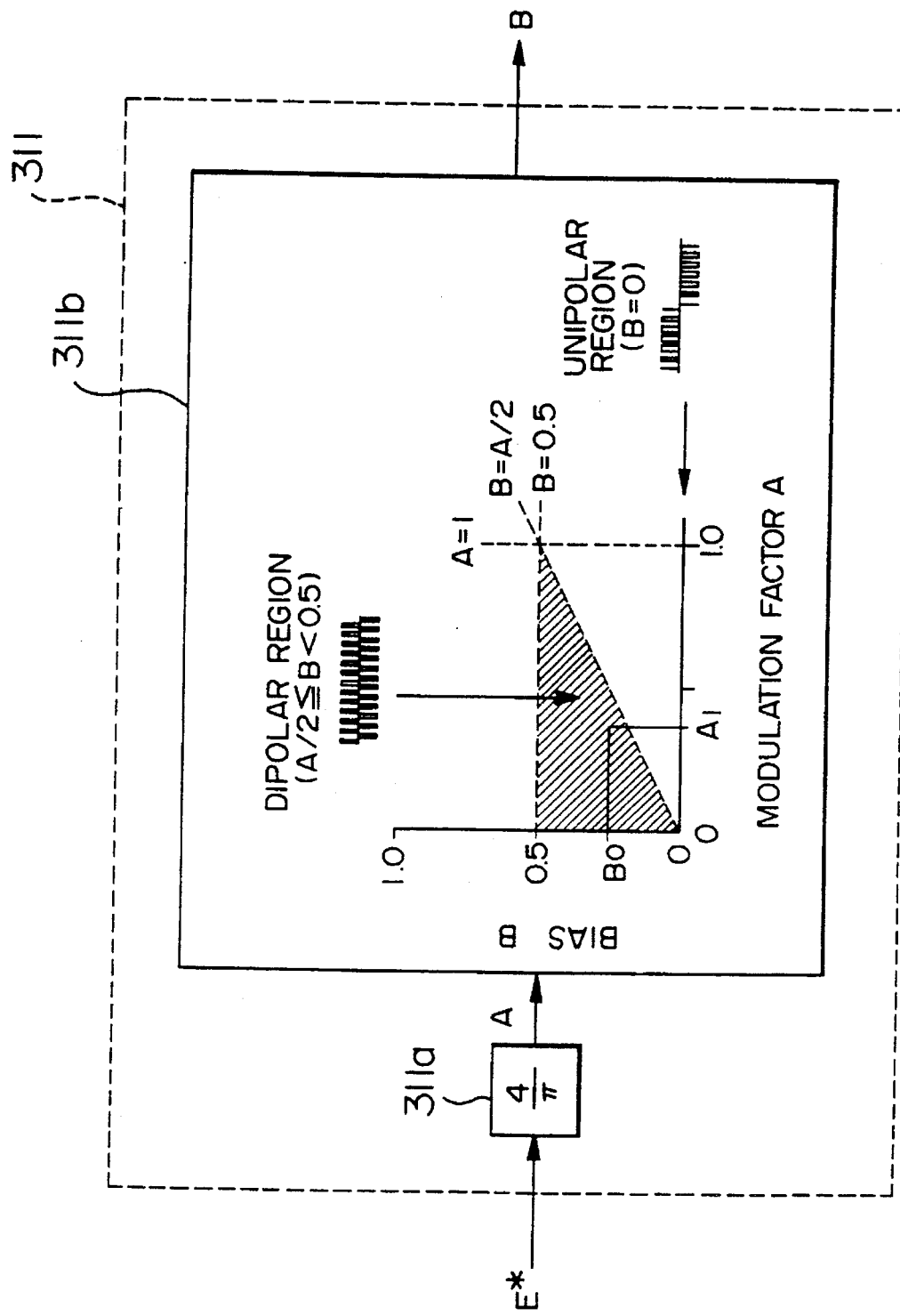
FIG. 5 schematically illustrates an example of dipolar/unipolar transfer controlling means.

It should be noted that the continuous transfer operation between the dipolar modulation and the unipolar modulation is performed by setting the bias "B". In FIG. 5, there is shown an example of an arrangement of dipolar/unipolar transfer controlling means 311 for performing the transfer control by setting this bias "B". The dipolar/unipolar transfer controlling means 311 converts the output voltage command E* into the modulation factor A by multiplying it by 4/π at 311a. The bias "B" corresponding to this modulation factor A is determined at a bias generating means 311b. That is to say, B=Bo (note: Bo=A/2) is set under such a condition that the modulation factor A is small, and a very small output voltage is required. When the amplitude A reaches A1, the bias B is equal to 0. If this value "A1" is so determined that the output voltage in case of A=A1 becomes larger than the voltage shown in equation (2), then the voltage control can be achieved from such a very small voltage containing 0.

Furthermore, the above-described positive/negative bias modulation waves "a bp" and "a bn" are distributed and combined with each other by a positive/negative distributing means 13 (FIG. 4) in such a manner that the positive portion among these bias modulation waves "a bp" and "a bn" is distributed to "ap", and the negative portion among them is distributed to "an", so that positive/negative modulation waves "ap" and "an", with maintaining continuity of the fundamental wave from the dipolar modulation to the unipolar modulation, are produced.

In other words, only the negative bias modulation wave "a bn" is inverted into a negative-side modulation wave "an" in the dipolar modulation. In the unipolar modulation, both of the positive-side bias modulation waves among the positive/negative bias modulation waves are added to each other, and both of the negative side bias modulation waves thereof are added to each other, whereby these added waves become the positive-side modulation wave "ap" and the negative-side modulation wave "an".

Based on the positive/negative modulation waves "ap" and "an", the pulse generating means 15 generates switching functions "Sp" and "Sn" whose pulse generation periods become 2To. In accordance with the switching frequency command Fsw*, the reference signal generating means 14 determines the pulse generation period To. Here, a relationship between the switching frequency command Fsw* and the pulse generation period To is expressed by the following equation:

$$To = 1/(2Fsw^*) \quad \text{Eq. 12}$$

A pulse generating operation by the pulse generating means 15 will now be explained with reference to FIG. 6.

Figure 6:
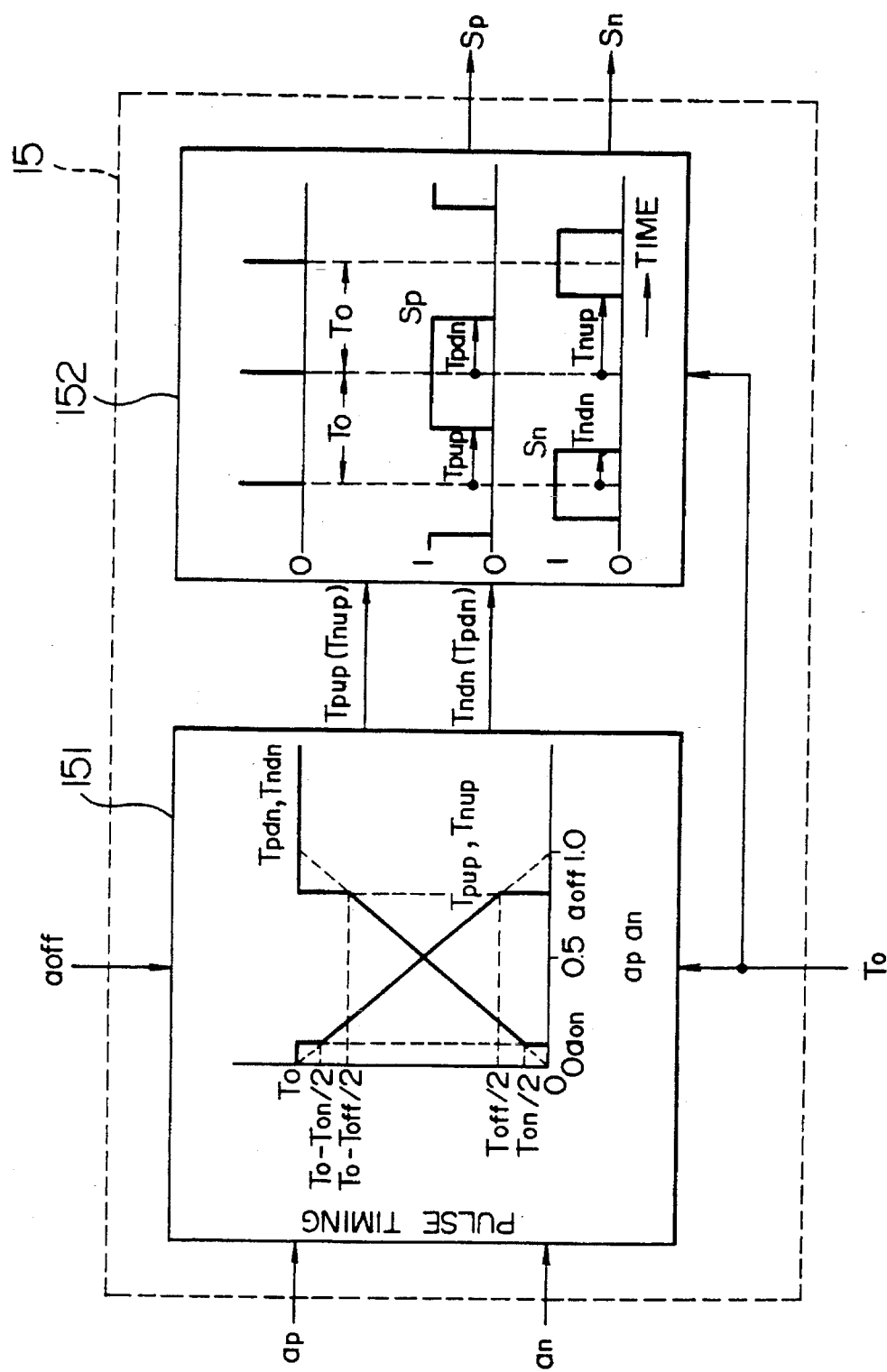
FIG. 6 schematically shows an example of pulse generating means in multiple pulse generating means.

In FIG. 6, a pulse timing setting means 151 calculates a rise timing "Tpup" of the switching function Sp, and a fall timing "Tndn" of the switching function Sn based upon "a p", "a n", "a off" and "To" (will be described later) in accordance with the following equations (process 1):

$$Tpup = \begin{cases} To & (a\,p < a\,on) \\ (1-ap)To & (a\,on \leq a\,p \leq a\,off) \\ 0 & (a\,p > a\,off) \end{cases} \quad \text{Eq. 13}$$

$$Tndn = \begin{cases} 0 & (a\,n < a\,on) \\ a\,n\,To & (a\,on \leq a\,n \leq a\,off) \\ To & (a\,n > a\,off) \end{cases} \quad \text{Eq. 14}$$

At the next period, both of a fall timing "Tpdn" of the switching function Sp and a rise timing "Tnup" of the switching function Sn are obtained in a similar manner to the above-described process 1 (process 2):

$$Tpdn = \begin{cases} 0 & (a\,p < a\,on) \\ a\,p\,To & (a\,on \leq a\,p \leq a\,off) \\ To & (a\,p > a\,off) \end{cases} \quad \text{Eq. 15}$$

$$Tnup = \begin{cases} To & (a\,n < a\,on) \\ (1-a\,n)To & (a\,on \leq a\,n \leq a\,off) \\ 0 & (a\,n > a\,off) \end{cases} \quad \text{Eq. 16}$$

The above-described process 1 and process 2 are alternately performed to produce the switching functions Sp and Sn.

Here, "a on" and "a off" are values determined by the minimum ON-time Ton and the minimum OFF-time Toff of the switching elements, and are given as follows:

$$\begin{cases} a\,on = Ton/(2\,To) \\ a\,off = 1 - Toff/(2\,To) \end{cases} \quad \text{Eq. 17}$$

Figure 7:
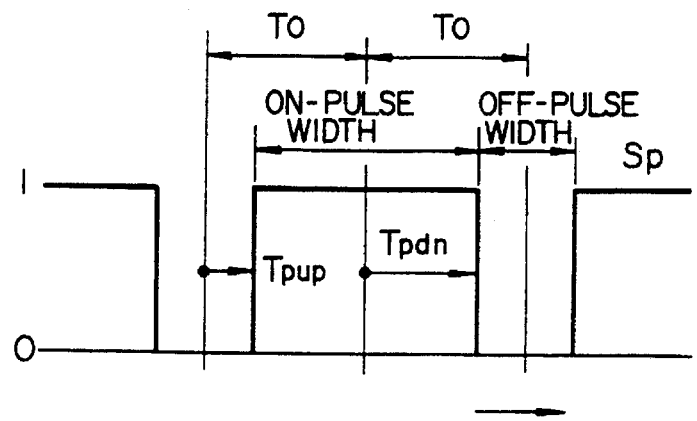
FIG. 7 is a waveform chart for representing a relationship between widths of ON/OFF pulses.

In other words, as represented in FIG. 7 (example of switching function "Sp"), an ON-pulse width "Twon" and an OFF-pulse width "Twoff" are defined as:

$$\begin{cases} Twon = To - (Tpup - Tpdn) \\ Twoff = To + (Tpup - Tpdn) \end{cases} \quad \text{Eq. 18}$$

Figure 8:
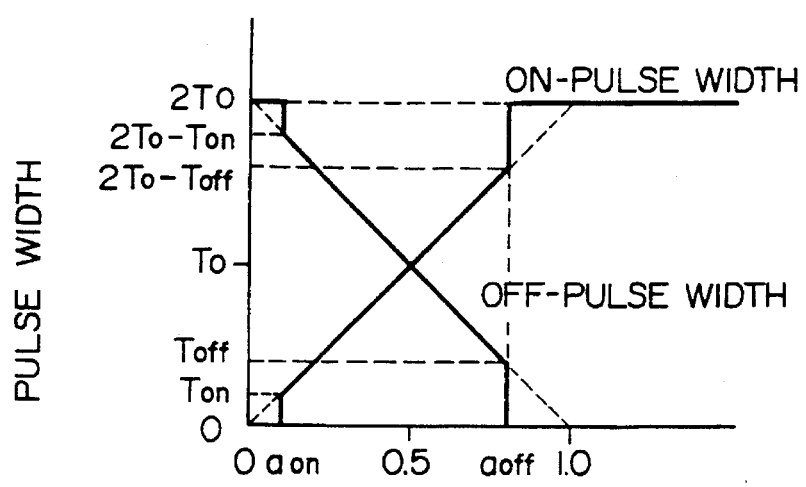
FIG. 8 schematically indicates a characteristic of the widths of the ON/OFF pulses.

The ON-pulse width and OFF-pulse width have characteristics indicated by a dotted line of FIG. 8. It should be noted that the characteristics should be modified as indicated by a solid line of FIG. 8 in order that the ON-pulse width Twon becomes shorter than, or equal to the minimum ON-time Ton determined by the switching elements, and also in order that the OFF-pulse width Twoff becomes shorter than, or equal to the minimum OFF-time Toff determined by the switching elements. To realize this modification, the function of the pulse timing setting means 151 shown in FIG. 6 has been added. As a result, since the discontinuity of the fundamental wave component of the output voltage produced by this function is very small, this discontinuity may be negligible.

It should be noted that "a off" is variable within such a range that the discontinuity of the fundamental wave component of the output voltage is negligible, and is supplied from a unipolar/overmodulation transfer controlling means 312 as the transfer timing from the unipolar modulation to the overmodulation. If "a off" is set to be a constant, the pulse generation may be simplified.

The switching function generating means 152 generates a reference signal having a period "To", and sets the switching functions Sp and Sn in synchronism with this generation of the reference signal based upon the above-explained Tpup, Tndn, or Tpdn, Tnup.

Figure 9:
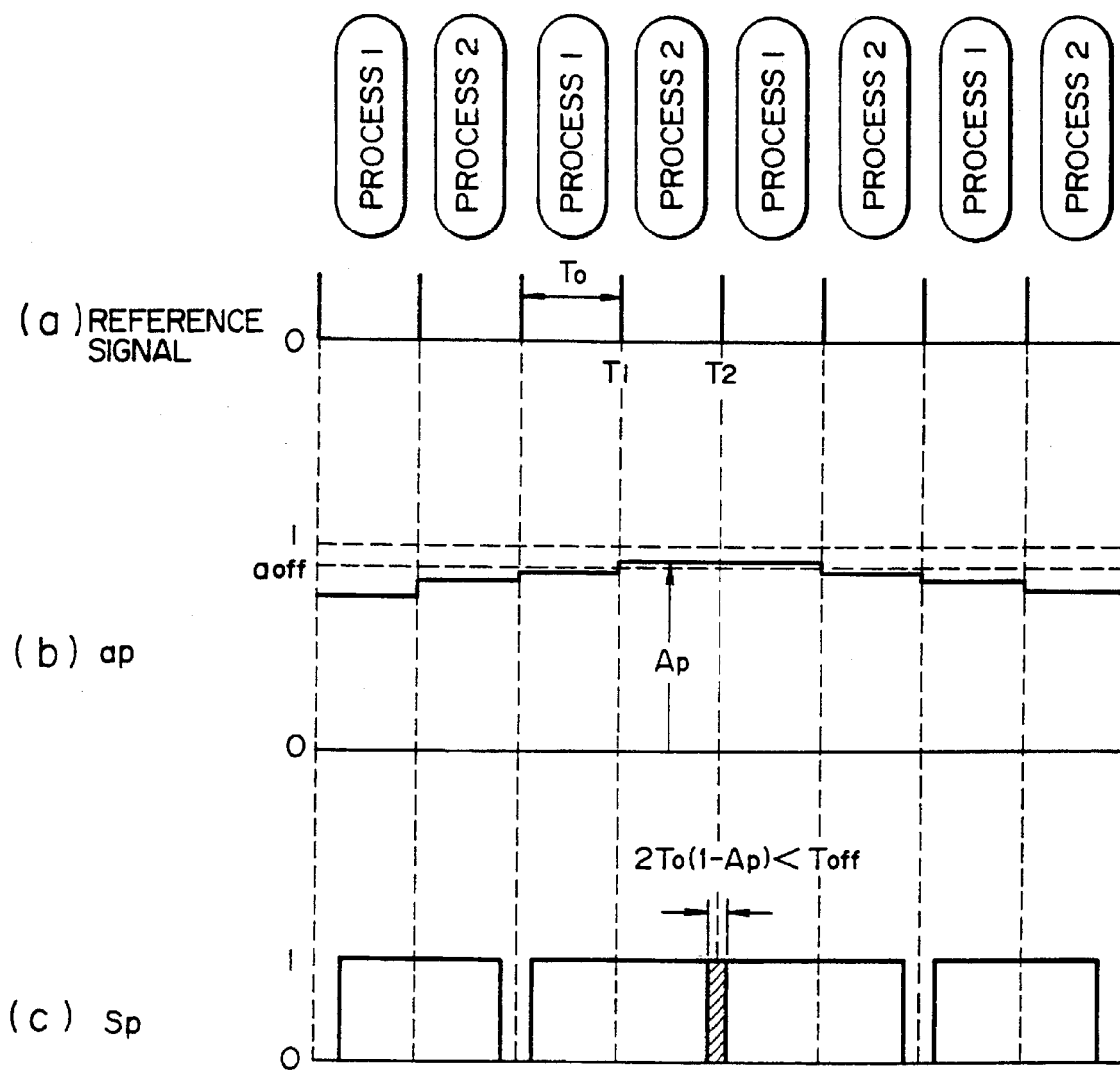
FIG. 9 schematically shows an example of an overmodulation waveform.

An example of the switching function during the overmodulation is shown in FIG. 9. When an instantaneous value exceeds "a off", a slit (namely, a hatched portion of FIG. 9c) between the pulses of the switching function Sp is filled. This filled slit width is smaller than the minimum OFF-time Toff of the switching element, and since the number of the slits gradually decreases by 1 to 2, substantially no adverse influence is given to the fundamental wave of the output voltage.

Figure 10:
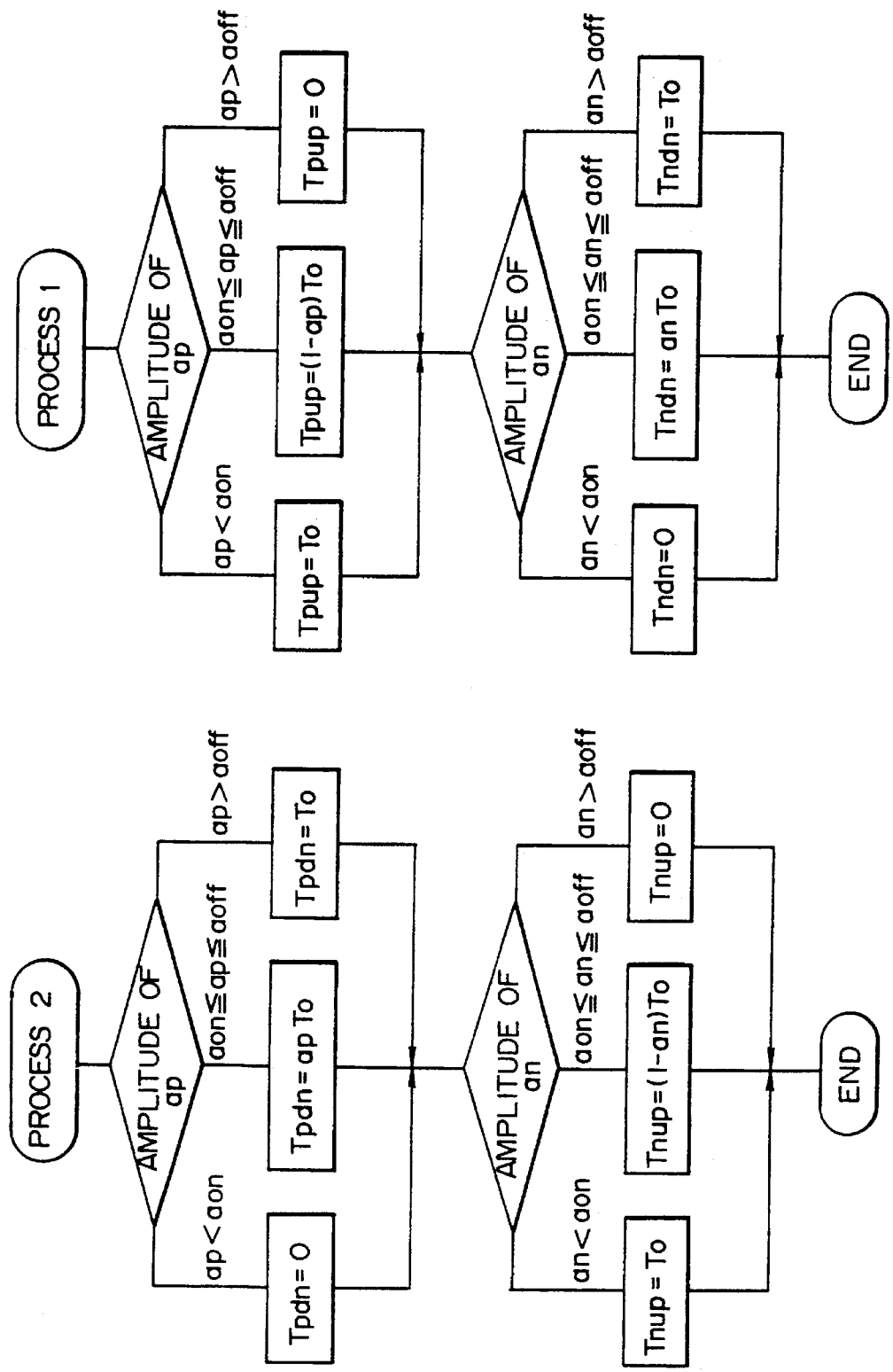
FIG. 10 is a flow chart of pulse timing setting means by way of software.

In FIG. 10, there is shown a flow chart for the case in which the pulse timing setting means 151 is realized by software.

In the overmodulation control, the slit between the pulses located at the central portion of the half period of the output voltage is filled to maintain the maximum voltage state, and the PWM control is carried out only for the position adjacent to the zero-cross point of the modulation waveform. As a result, the modulation factor A and the actually derived output voltage become nonlinear in this region. Even when the modulation factor A is increased in a linear form, the output voltage is not increased in a linear form in following the linear increase.

Accordingly, the modulation factor A is set in a nonlinear form in order to linearize the output voltage during the overmodulation. That is to say, assuming now that the switching frequency at the PWM control portion is sufficiently high, a relationship between a root-mean-square value E of the fundamental wave of the output voltage and the modulation factor A is expressed by the following equation:

$$E = \frac{1}{2} \left\{ A \sin^{-1} \frac{1}{A} + \sqrt{1 - A^{-2}} \right\} E_{max} \qquad \text{Eq. 19}$$

Figure 11:
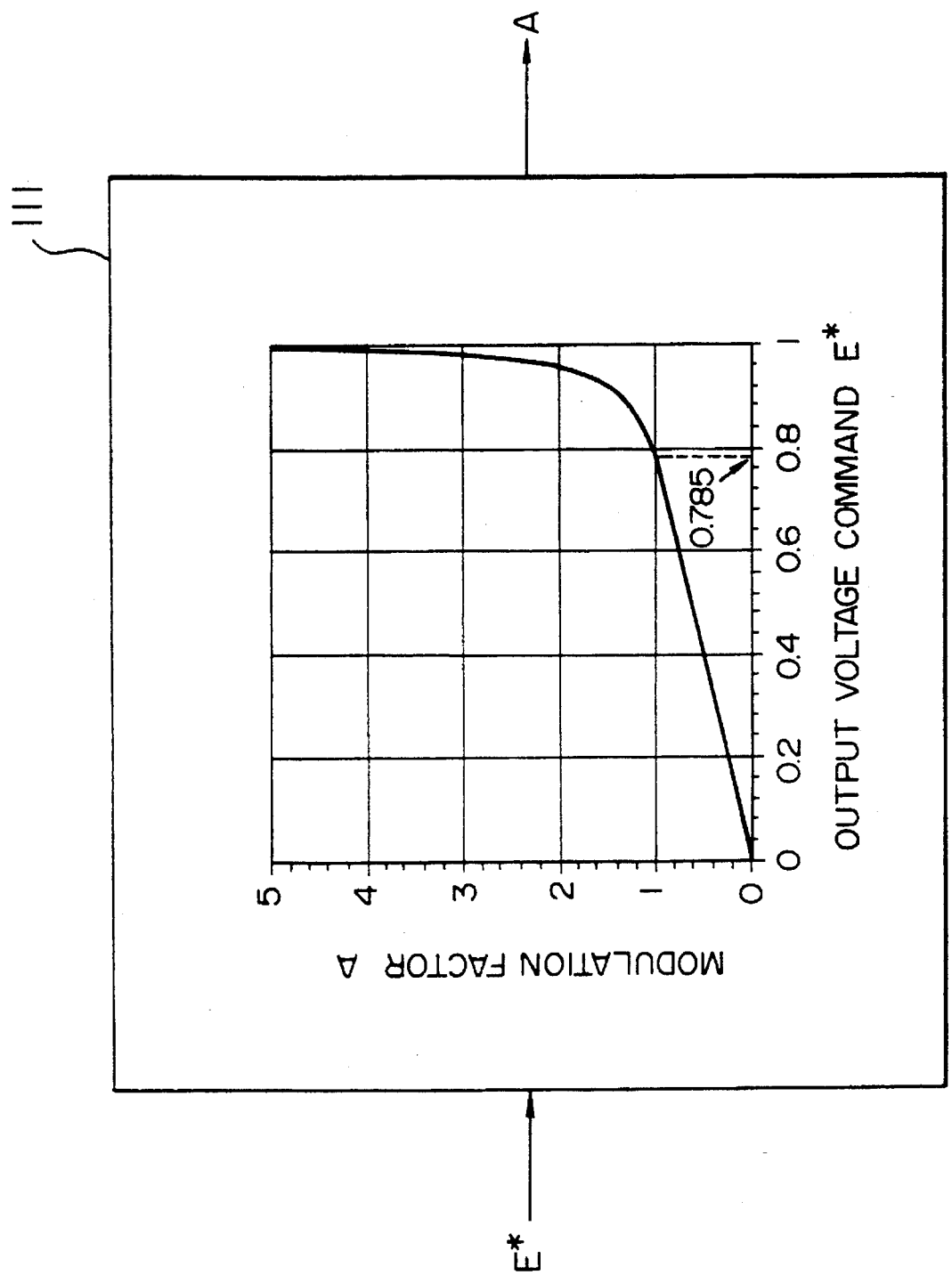
FIG. 11 schematically shows an example of a construction of amplitude setting means.

As a consequence, a relationship between E* and A is previously calculated from the above-described equation (19), an amplitude setting means 111 shown in FIG. 11 is arranged, so that the output voltage may be adjusted in a linear manner with respect to E*. As a result, especially, the voltage controlling characteristic at the high voltage region near the 1-pulse mode can be improved.

Figure 12:
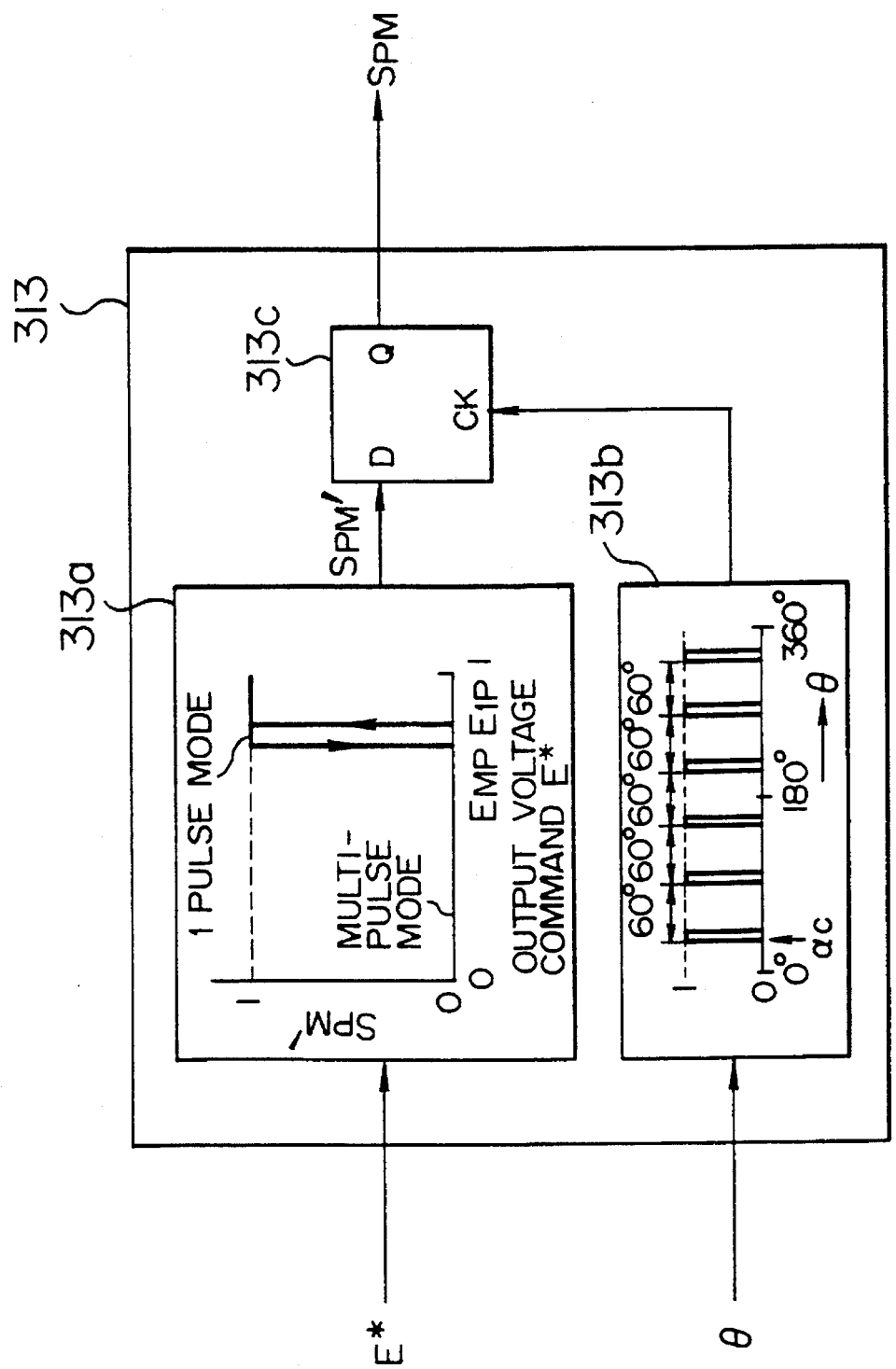
FIG. 12 schematically indicates an example of multi-pulse/1-pulse change controlling means.

When the voltage command is further increased, the operation mode is transferred from the overmodulation mode to the 1-pulse mode by means of the selecting switch 32 of the transfer controlling means 3 (FIG. 4). The selecting switch 32 is operated under the following conditions:

when $S_{PM}=0$, which corresponds to one of outputs from the multi-pulse transfer controlling means 31, this selecting switch 32 is switched to the multi-pulse mode side; and when $S_{PM}=1$, the selecting switch 32 is switched to the 1-pulse mode side. In FIG. 12, there is shown an example of the 1-pulse/multi-pulse change controlling means 313. In this example, hysteresis is provided in such a manner that when the voltage command E* exceeds E1p, the operation mode is transferred from the multipulse mode to the 1-pulse mode, whereas when the voltage command E* becomes smaller than EMP, the operation mode is transferred from the 1-pulse mode to the multi-pulse mode. As a result, an inadvertent PWM mode transfer is suppressed and a stable output voltage having less transition variation can be produced.

In this preferred embodiment, the mode transfer from the overmodulation mode to the 1-pulse mode corresponds to the overmodulation mode, and the modulation factor is not increased until the pulse number becomes 1 pulse.

As described above, when the operation mode is transferred to the 1-pulse mode, the sideband component makes interference with the fundamental wave, so that the continuity of the output current is lost and a torque variation is induced.

Therefore, in accordance with this preferred embodiment, in the overmodulation mode, the operation mode is forcibly transferred to the 1-pulse mode even at a stage that a plurality of pulses contained in the half cycle of the fundamental wave are present (will be discussed in detail).

The 1-pulse generating means 2 is constructed of a phase calculating means 21 and a pulse generating means 22. The operation of the phase calculating means 21 is completely the same as that of the amplitude setting means 111. The output of this phase calculating means 112 may be utilized by omitting the phase calculating means 21.

Figure 13:
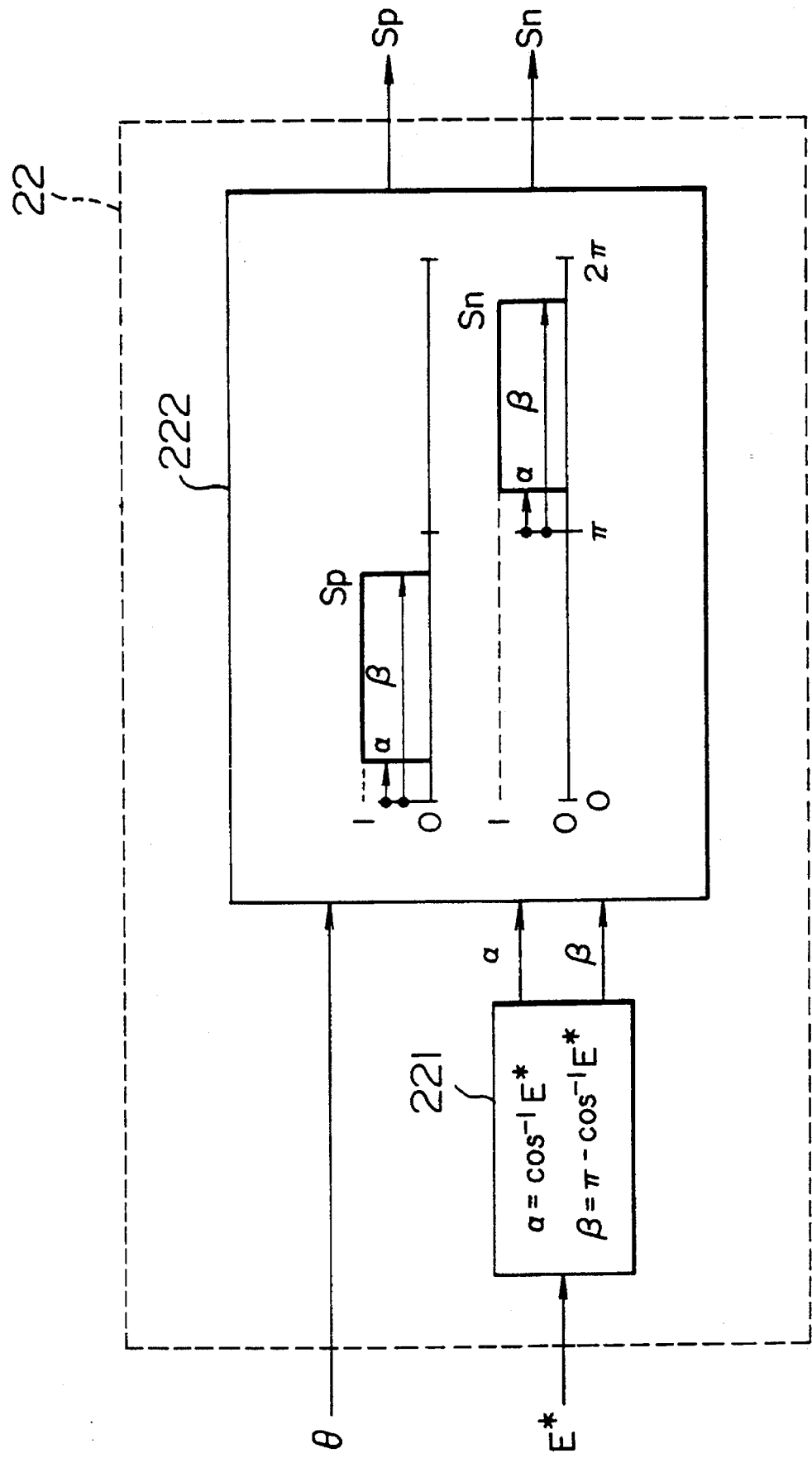
FIG. 13 schematically represents an example of 1-pulse generating means.

An example of a structure of the pulse generating means 22 is represented in FIG. 13. In the 3-level PWM control mode, the output voltage may be adjusted under the 1-pulse control by controlling the pulse width, which is different from the 2-level PWM control mode. Accordingly, a rise-timing phase "α" and a fall-timing phase "β" for a pulse are obtained from the voltage command E* as follows:

$$\begin{cases} \alpha = \cos^{-1} E^* \\ \beta = \pi - \cos^{-1} E^* \end{cases} \qquad \text{Eq. 20}$$

These timing phases "α" and "β" are set with the phase "θ" being a reference, and the switching functions Sp and Sn are produced and outputted, so that the 1-pulse waveform is realized.

As described above, the dipolar modulation, unipolar modulation and overmodulation are realized based upon the united voltage command, and continuous transfer control can be achieved up to 1 pulse as the maximum output.

There are advantages in this preferred embodiment that the output voltage can be continuously and smoothly adjusted from zero voltage to the maximum voltage, and furthermore stable output voltage with high precision can be supplied.

In this connection, note that, in the first preferred embodiment shown in FIG. 4, the output pulse train of the above-described multiple pulse generating means is produced in an asynchronous condition with the frequency of the inverter, and the output pulse of the 1-pulse generating means is so controlled as to be synchronized with the frequency of the inverter.

The reason is to prevent the various problems of the prior art. That is to say, according to the above-described prior art for employing the synchronization method in the multiple pulse region, as the first problem, a complex control is required to supervise the phase. As the second problem, when the output voltage command must be distorted from the sine wave in reply to a certain control demand (In FIG. 1, the inverter frequency Fi* and the output voltage command E* have been adjusted in response to the demand for controlling the electric car), the output voltage instruction cannot be correctly reproduced.

That is to say, as the first problem, in accordance with the synchronization type electric power converting system, since the pulses have a frequency higher than the frequency of the inverter by an integral number of times, a table having the relationship between the phase and the generated pulse for every pulse mode is employed from which the pulse generation phase is read out based upon the pulse mode and the inverter frequency. To achieve such a phase management, a large number of memories for each pulse mode and a large amount of compilation are required, which would induce complex controls.

As the second problem, the conventional synchronization type electric power converting system has the pulse data for 90°. However, since these data have been formed in such a manner that the output voltage becomes a sine wave, the output voltage cannot be correctly expressed in accordance with the instruction.

Therefore, in accordance with the present embodiment, these conventional problems could be solved by generating the pulse under an asynchronous state with the inverter frequency in the multi-pulse mode.

In other words, with regard to the above-described first problem, the pulses can be independently generated without any restrictions due to the inverter frequency in order to generate the pulses. That is to say, in FIG. 4, the switching frequency command $F_{SW*}$, can be independently set with respect to the inverter frequency command Fi* (in FIG. 4, the reference generator 14 is independent from the inverter frequency). As a result, the control can be simplified without requiring a complex control procedure to generate the pulses.

As to the second conventional problem, if the electric power converting system is of the asynchronous type, no long data are stored for each phase. Since the pulses corresponding to the instantaneous voltage command can be outputted, even a distorted sine wave can be correctly represented. As previously stated, since the controls related to the phase calculations and the like can be simplified, it is possible to perform such a calculation for outputting the pulses corresponding to the voltage command one by one. Since the calculation period can be shortened, fidelity can be increased.

Also, if an asynchronous type electric power switching system is employed, since the switching frequency does not depend on the inverter frequency, variations in the switching frequency can be minimized. Thus, there is another merit that the tone variations (noises, unpleasant sounds) occurring before/after the pulse mode change, which exist in the conventional synchronization type electric power converting system, can be minimized.

Also, although the 3-level inverter has been described as the above-described preferred embodiment, such is also the case with a 2-level inverter, or multi-level inverter higher than the 3-level inverter.

Figure 14:
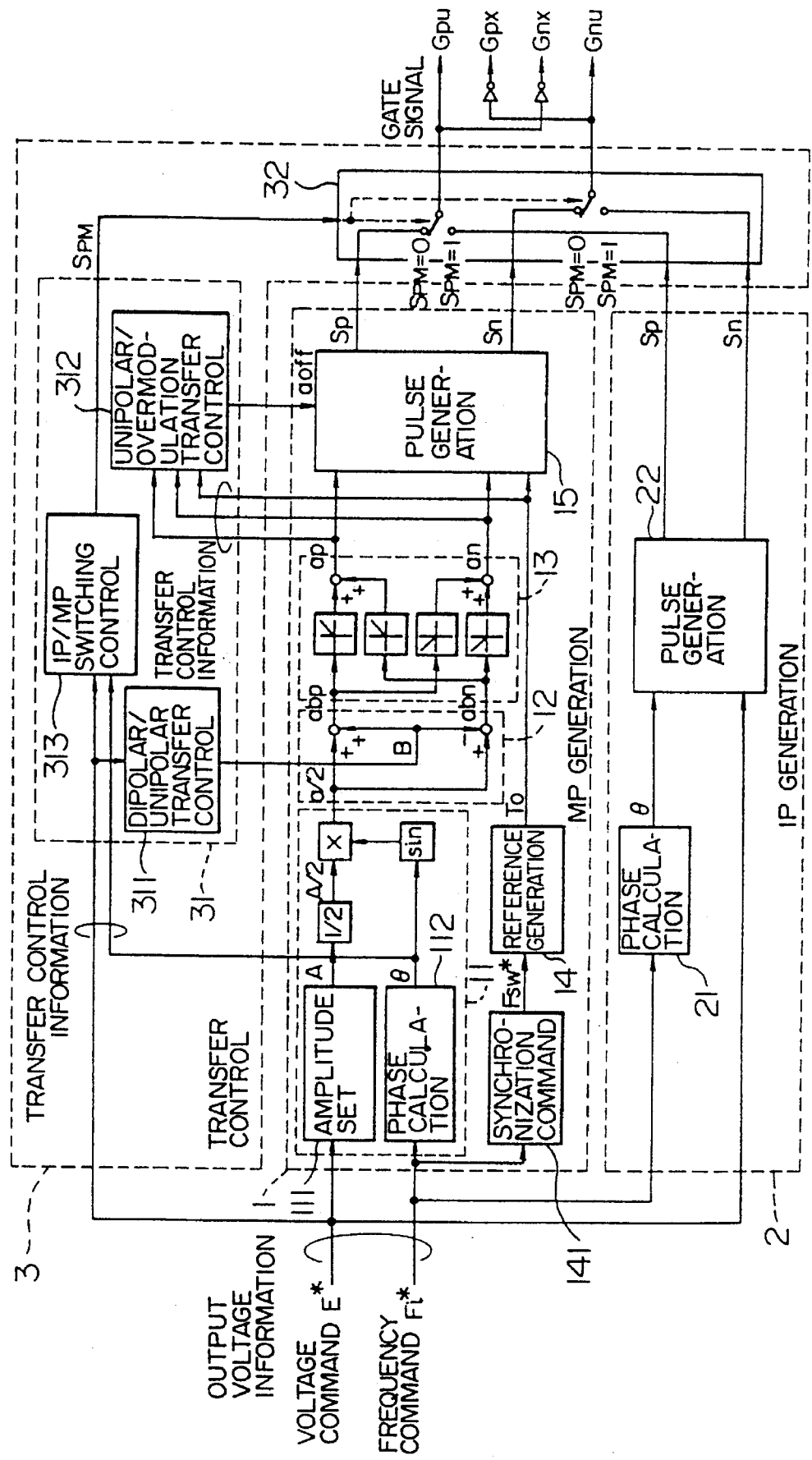
FIG. 14 schematically shows an example of an arrangement of another preferred embodiment.

In the mean time, in case of such a switching element as a GTO thyristor which is switched at relatively low frequencies, interference between a side-band component of an output voltage high harmonic wave, which is produced in accordance with the switching frequency, and a fundamental wave component of the inverter frequency, may occur. To avoid such an interference, the dipolar modulation mode and the unipolar modulation mode are performed under an asynchronous condition with regard to the inverter frequency among the PWM modes of the multi-pulse generating means, whereas the overmodulation mode and the 1-pulse mode are performed in synchronization with the inverter frequency (FIG. 14).

With such an arrangement, more stable voltage can be supplied, even in the overmodulation mode.

Figure 15:
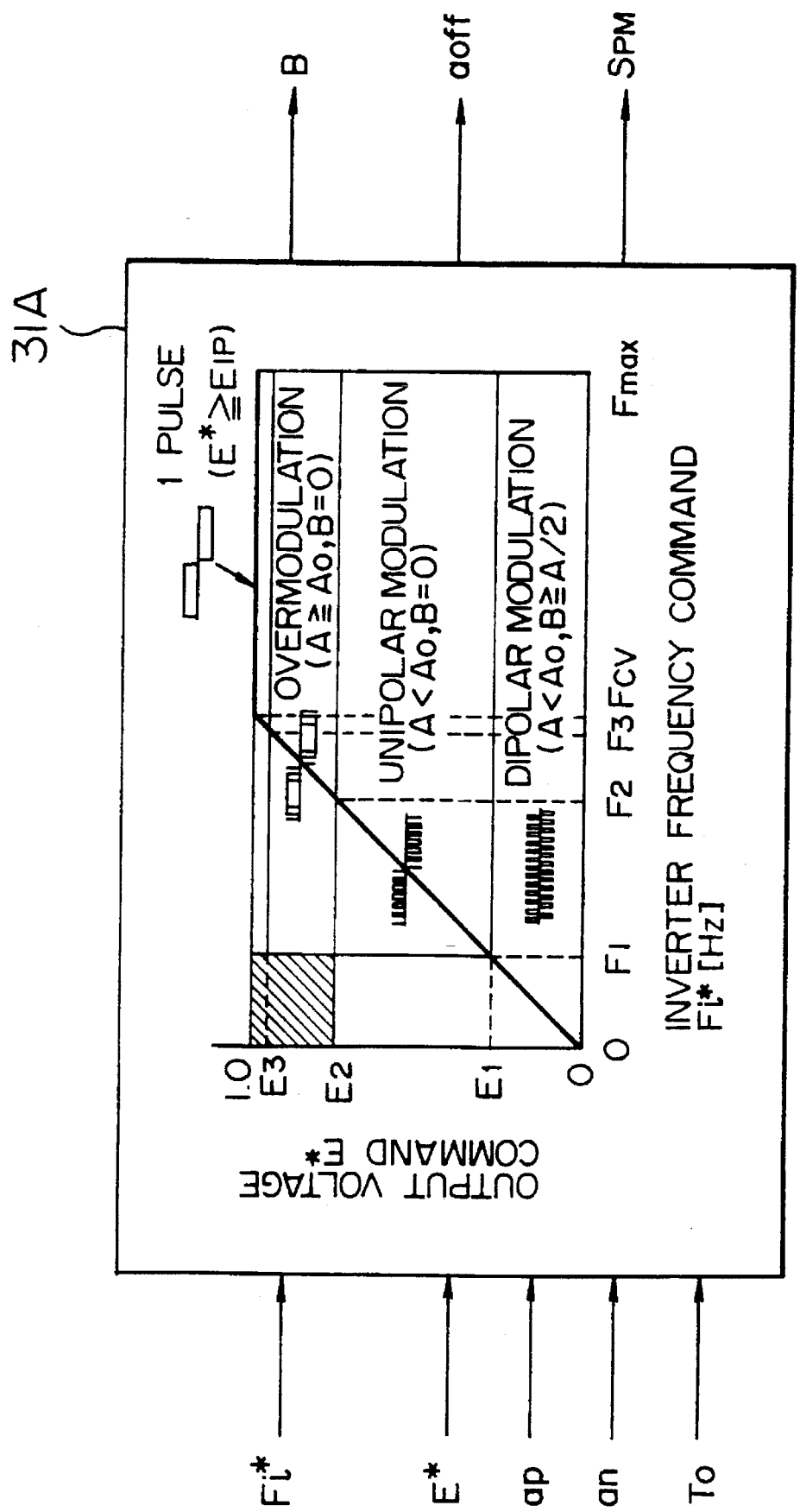
FIG. 15 schematically represents one example of transfer controlling means.

In FIG. 15, there is shown a multi-pulse transfer control according to another preferred embodiment of the present invention. It should be noted that only a multi-pulse transfer controlling means 31A is represented. This preferred embodiment is to transfer 4 sorts of PWM mode in accordance with both of the inverter frequency command Fi* and the voltage command E*. In other words, when such a condition is satisfied that Fi*<F1 and E*<E1, the dipolar modulation mode is employed. When such a condition is satisfied that Fi*≧F1 and E1≦E*<E2, the unipolar modulation mode is employed. When such a condition is satisfied that E2≧E*<E3, the overmodulation mode is employed. When such a condition is satisfied that E≧E3, then the 1-pulse mode is employed. As a consequence, even when the output voltage is soft-started at a highspeed range where the frequency is high, such as a regenerative initiation and repowering, such a transfer condition as the dipolar modulation, the unipolar modulation, the overmodulation, and the 1-pulse modulation mode in this order can be satisfied, and a stable voltage rising operation is available. Also, since the dipolar modulation control is continuously carried out in the lower frequency region, it is possible to avoid current concentration into a specific switching element as in case of the unipolar modulation mode.

A description will now be made of an electric power converting system according to a second preferred embodiment of the present invention.

Figure 16:
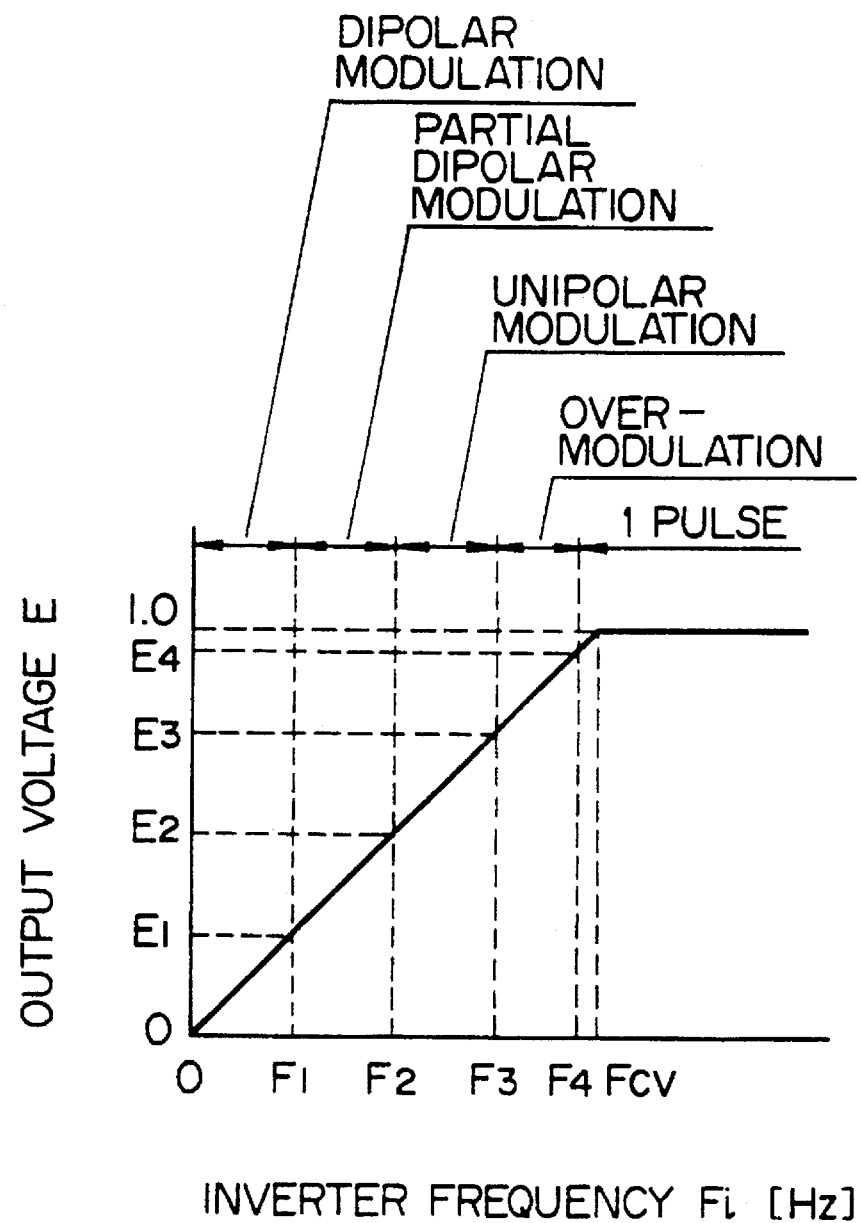
FIG. 16 shows a relationship between an output voltage characteristic and a PWM mode in case of another PWM mode.

As represented in FIG. 16, by extending the idea of the first preferred embodiment, if a partial dipolar modulation, where the dipolar modulation waveform and the unipolar modulation waveform are mixed, is introduced between the dipolar modulation mode and the unipolar modulation mode, more smoothing of the output voltage and the switching frequency can be emphasized.

Figure 17:
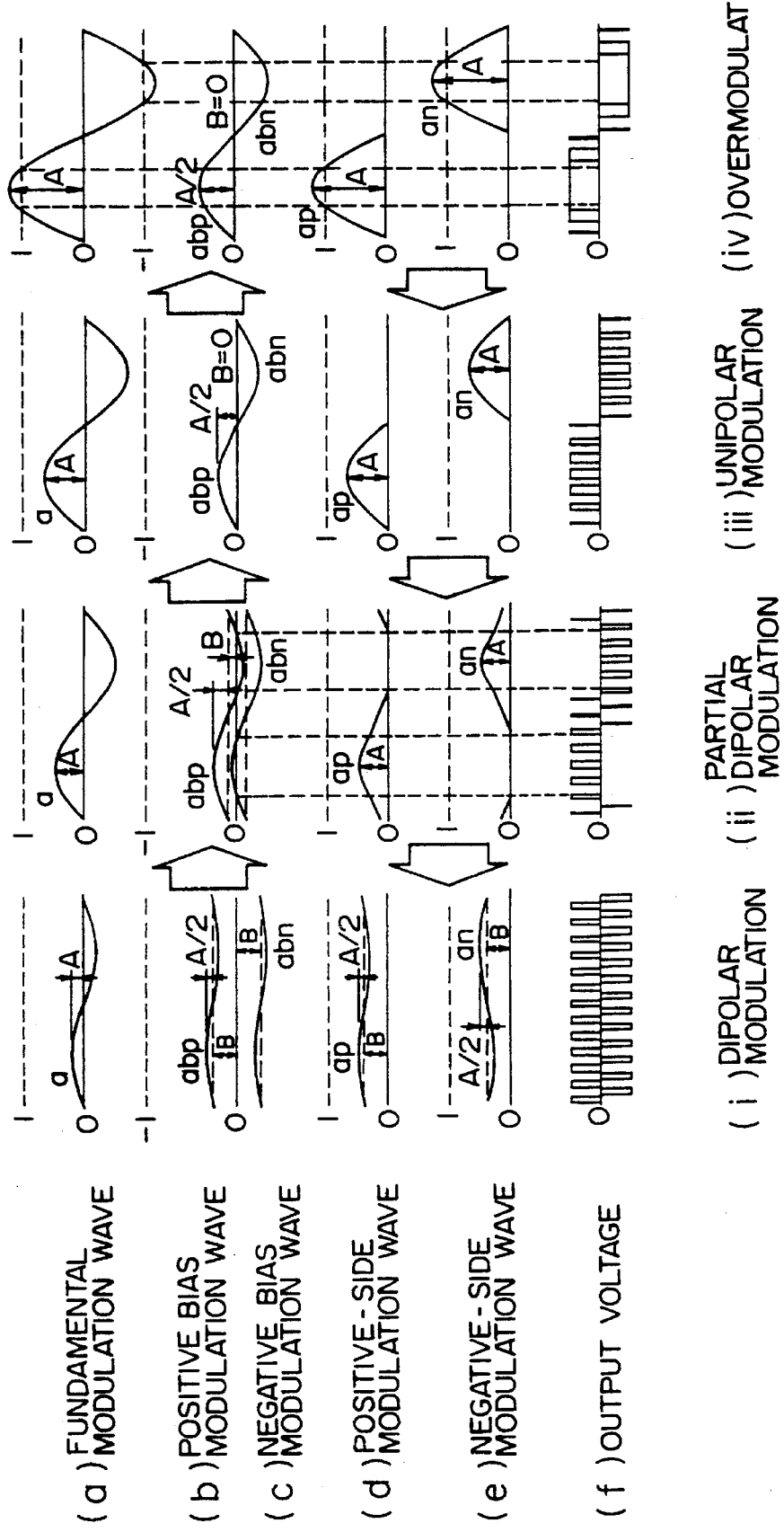
FIG. 17 is an explanatory diagram of a modulation waveform of that another PWM mode.

An example of output voltage instruction wave-form is shown in FIG. 17. In FIG. 17, the modulation modes other than (ii) partial dipolar modulation mode are identical to those of FIG. 3. As to this partial dipolar modulation, a description will now be made as follows.

Due to effects of the bias superimposition and the positive/negative distribution, even when the bias "B" is set to such a range (0<B<A/2) which is neither the dipolar modulation, nor the unipolar modulation, the voltages fitted to the demands of the fundamental modulation wave can be reproduced without any shortage/surplus. In this case, the partial dipolar modulation is comprised of the unipolar modulation mode employed around the peak portion of the output voltage and the dipolar modulation employed for the lower portion of the output voltage. At this time, a positive-side modulation wave "a p" and a negative-side modulation wave "an" are expressed by:

$$a\,p = \begin{cases} a\,bp & (a\,bp > 0, a\,bn < 0) \\ a\,bp + a\,bn & (a\,bp > 0, a\,bn > 0) \\ 0 & (a\,bp \leq 0) \end{cases} \quad \text{Eq. 21}$$

$$a\,n = \begin{cases} -a\,bn & (a\,bp > 0, a\,bn < 0) \\ -(a\,bp + a\,bn) & (a\,bp < 0, a\,bn < 0) \\ 0 & (a\,bn \geq 0) \end{cases} \quad \text{Eq. 22}$$

As easily seen from the foregoing description, (ap-an) is continuously coincident with the fundamental modulation wave "a", and the continuity of the instantaneous value of the output voltage fundamental wave can be maintained.

If the bias B is gradually decreased in response to an increase of the modulation factor A by utilizing the above-described features, the modulation mode may be continuously transferred from the dipolar modulation via the partial dipolar modulation to the unipolar modulation. It is of course possible to perform another modulation transfer opposite to the above-described modulation transfer.

Figure 18:
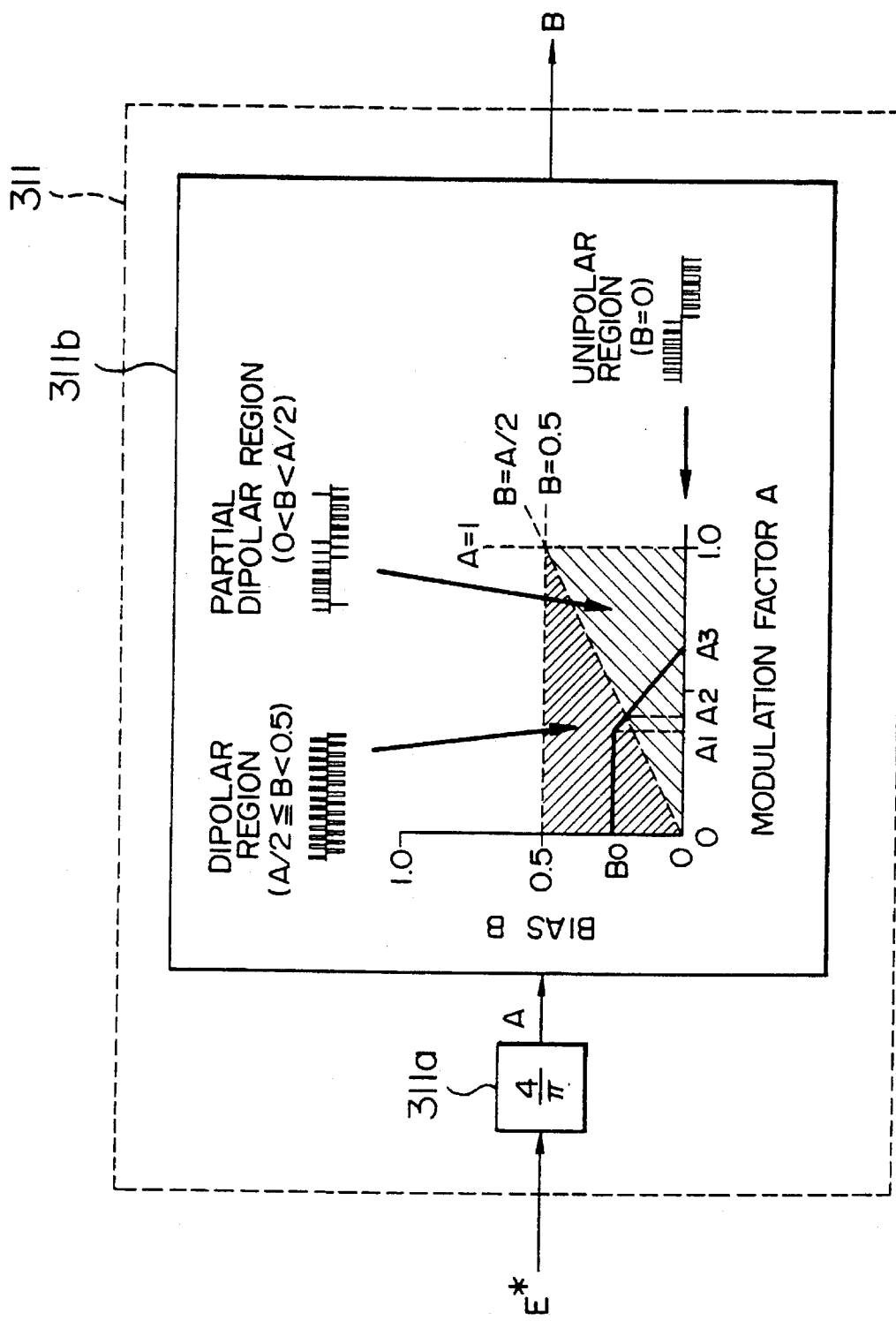
FIG. 18 shows an arrangement of transfer controlling means for realizing another PWM mode.

In FIG. 18, there is shown an example of a dipolar/unipolar transfer controlling means. As indicated by a solid line of FIG. 18, if the bias B is set, than the dipolar modulation is performed within a range of 0≦A≦A1, the partial dipolar modulation is executed within a range of A1<A<A2, and the unipolar modulation is carried out within a range of A≧A2. In this case, since no noise is produced from the motor when the switching operation is performed between the dipolar modulation and the unipolar modulation, the electric power converting apparatus can be driven under low noise conditions.

Figure 19:
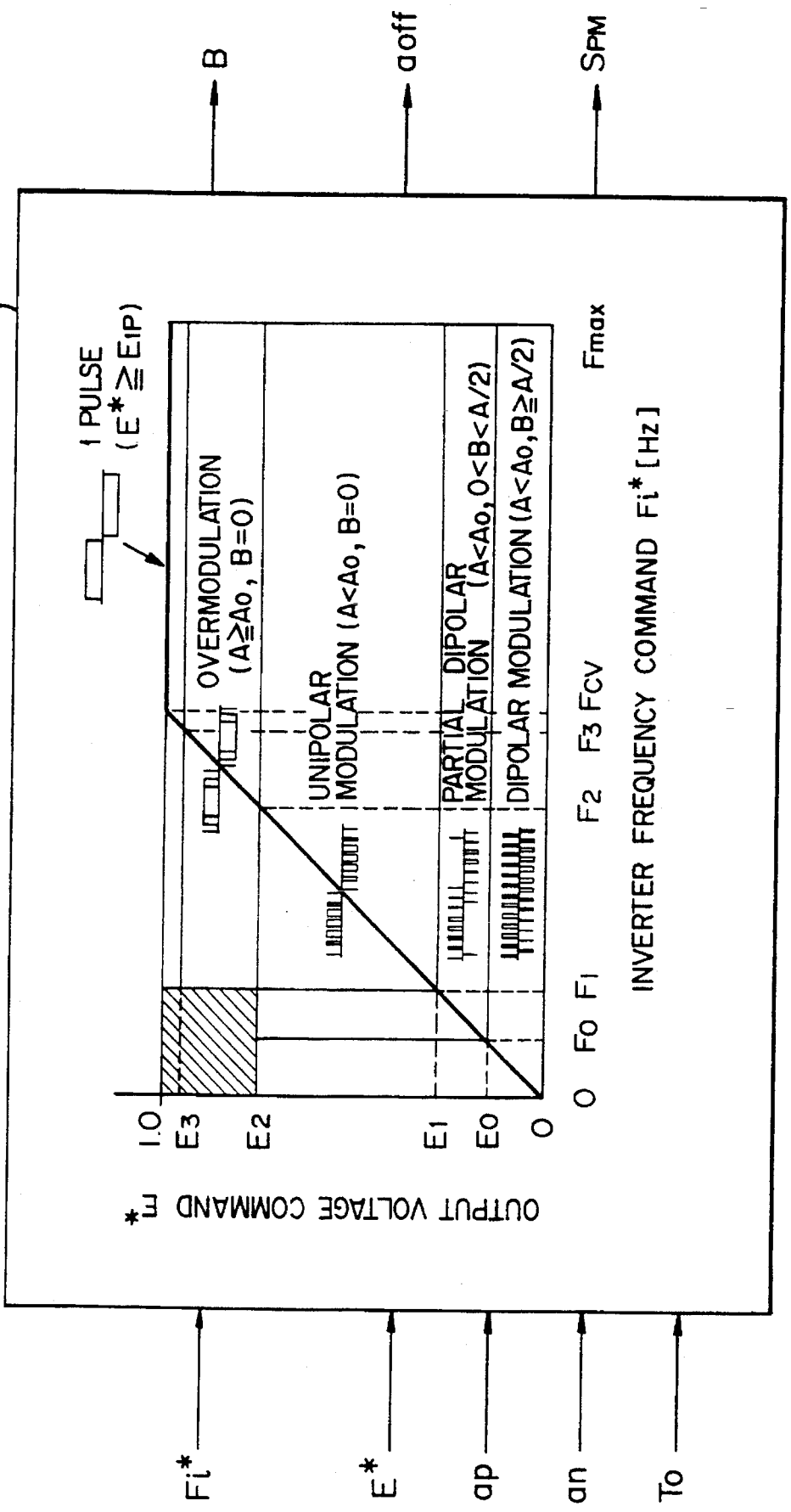
FIG. 19 schematically shows one example of transfer controlling means.

If the modulation transfer control idea of FIG. 18 is utilized, then the PWM modes may be supervised for each region as shown in FIG. 19. FIG. 19 shows only a multi-pulse transfer controlling means 31B. This transfer controlling means is to transfer 5 sorts of PWM modes, depending upon both of the inverter frequency command Fi* and the voltage command E*. That is to say, when a condition is satisfied that Fi*<Fo and E*<Eo, the dipolar modulation mode is employed. When a condition is satisfied that Fo≦Fi*<F1 and Eo≦E*<E1, the partial dipolar modulation is employed. When a condition is satisfied that Fi*>F1 and E1≦E*<E2, the unipolar modulation is employed. Also when a condition is satisfied that E2≦E*<E3, the overmodulation is used, and when E*≧E3 is satisfied, the 1-pulse modulation is employed. As a result, even in the case in which the output voltage is soft-started at a high-speed region with a high frequency during, for instance, regenerative initiation and repowering, such a transfer condition as the dipolar modulation, the partial dipolar modulation, the unipolar modulation, the overmodulation, and the 1-pulse modulation mode in this order, can be satisfied, and thus a stable voltage rising operation is available. Even during readhesion control, a similar effect to that of the regenerative initiation can be obtained. Furthermore, there is another advantage that an occurrence of noise from the motor when the pulse mode is changed can be minimized, even under any operation conditions.

In the mean time, in an inverter employed in an electric vehicle control apparatus for a railroad vehicle, a variable range of the inverter frequency Fi* is selected to be on the order of 0 to 300 Hz. The inverter frequency Fcv at which the output voltage becomes maximum, is equal to ⅕ to ⅓ the upper limit frequency of the variable inverter frequency, and the upper limit frequency of the inverter frequency Fcv is approximately 100 Hz. To avoid variations in the output current caused by interference between the high harmonic waves generated near the switching frequency and the fundamental wave having the inverter frequency when the pulses are produced under an asynchronous condition, the switching frequency is required to be a value obtained by multiplying the inverter frequency Fcv by about 10, namely higher than 1 KHz.

Furthermore, to suppress the above-described noises, it is effective to minimize the variations in the switching frequency. The variations in the switching frequency in the multi-pulse region may be suppressed within 1 to 2 Fi by introducing the overmodulation mode.

Figure 20:
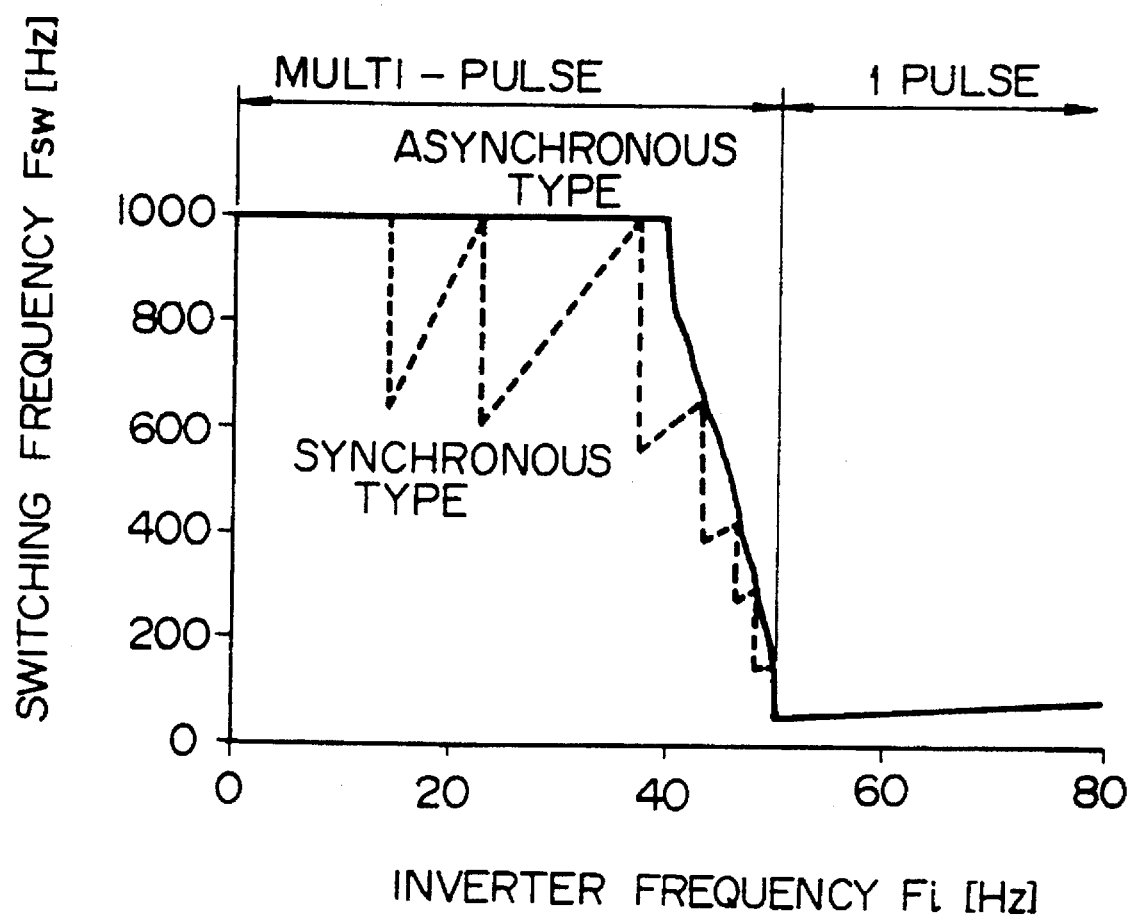
FIG. 20 is an explanatory diagram for explaining a relationship between an inverter frequency and a switching frequency.

FIG. 20 is a comparison diagram of variations in the switching frequencies when the multi-pulse region is under the asynchronous condition, and the asynchronous condition, and also under the synchronous condition. When the multi-pulse region is under the synchronous condition, the switching frequency is changed in a discontinuous mode, whereas when the multi-pulse region is under the asynchronous condition, the switching frequency is varied in a continuous mode. As a result, a change in tone become low.

Referring now to FIGS. 4, 12, 22 and 23, a transfer control between an overmodulation mode and a 1-pulse mode will now be explained.

In FIG. 4, the 1-pulse/multi-pulse switching control means (1P/MP switching control) 313 determines a signal SPM for changing either the overmodulation mode into the 1-pulse mode, or the 1-pulse mode into the overmodulation mode by inputting the voltage command E* corresponding to the transfer control information and the phase θ of the output voltage.

In FIG. 12, there is shown an example of a structure of the 1-pulse/multi-pulse switching control means 313. A switching voltage detector 313a inputs therein the output voltage command E*, and outputs the signal SPM'=1 when the output voltage command E* reaches the reference value E1P, and also outputs the signal SPM'=0 when the output voltage command E* is lowered to the reference value EMP.

On one hand, the switching timing generator 313b outputs 1 under such a condition that the phase θ corresponding to the output of the phase calculating means 21 becomes the PWM mode transfer phases αc, αc+60°, αc+120°, αc+180°, αc+240°, and αc+300°, and outputs 0 when this phase becomes any phases other than the above-described phases.

Furthermore, the latch means 313c latches the content of the output signal SPM' of the switching voltage detector 313a at the output timing of the switching timing generator 313b.

Figure 22:
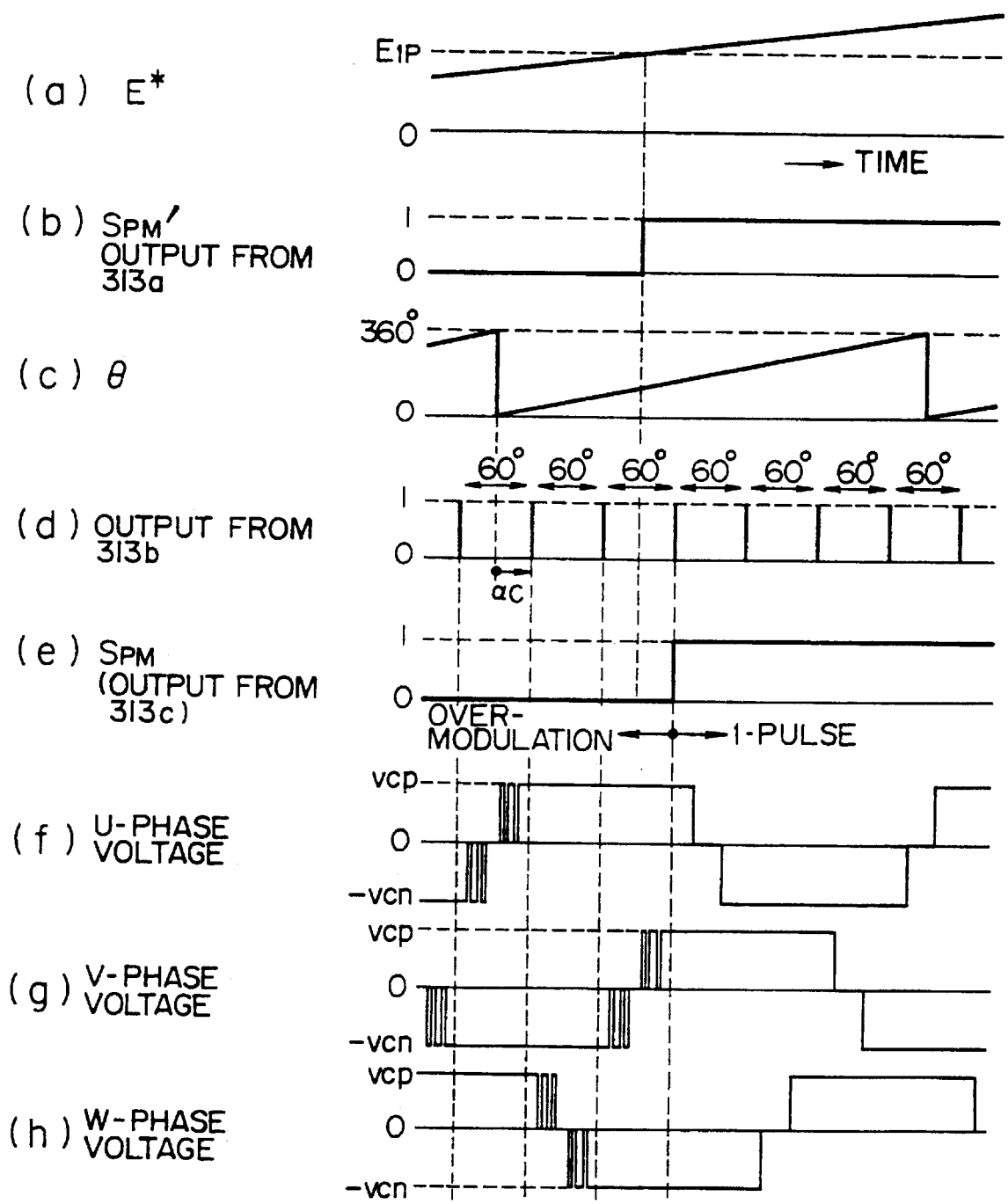
FIG. 22 is an explanatory diagram for explaining an operation of overmodulation/1-pulse transfer control.

With reference to FIG. 22, an operation of this 1-pulse/ multi-pulse switching control means will now be explained.

In FIG. 22(a), there is shown the voltage command E*. When E*≧E1P, this switching control means outputs the signal SPM'=1 as shown in FIG. 22(b). FIG. 22(c) represents the phase as the reference of the output voltage. FIG. 22(d) shows an output from the switching timing generator 313b, which becomes 1 under θ=αc and at the phase with 60°-interval. FIG. 22(e) shows an output of the latch means 313c. At the time when 1 is outputted from the switching timing generator 313b after the switching voltage detector 313a produces the output, the latch means outputs the actual switching timing signal SPM.

To smoothly transfer the PWM mode, the transfer voltages E1P, EMP, and the PWM mode transfer phases αc, αc+60°, αc+120°, αc+180°, αc+240°, αc+300° constitute important factors.

It was confirmed by experiments that if the PWM mode was switched while even 1 phase among 3 phases of the inverter output a neutral-point voltage, the fundamental wave and the current became discontinuous and induced a torque pulsation. Therefore, in the overmodulation mode, no PWM mode switching operation is carried out until such an output voltage command can become by which a phase region is established such that the modulation stop periods are overlapped with each other in all of these phases. This modulation stop period implies such a period during which a pulse with a wide width is outputted near the peak of the fundamental wave. Furthermore, the PWM mode is switched at this overlapped phase.

Since the output voltage command E*, where the modulation stop periods are overlapped with each other in all phases, corresponds to a voltage at which the start phase α1 of the modulation stop period is lower than 30°, when the voltage instruction is calculated at this time, E*=0.957. As a consequence, this value is determined as a lower limit value for the reference values E1P, EMP (≧0.957, namely A=2 in equation 19) of the transfer voltage.

Also, an upper limit value is such a value determined by the switching frequency. The PWM mode must be changed into the 1-pulse mode at least under such a condition that there are plural pulses contained in a half cycle of the fundamental wave. This is because, as previously stated, when the PWM mode is switched from the 1-pulse mode not controllable by the PWM mode (i.e., 1-pulse mode obtained by increasing the modulation factor in the overmodulation mode) into the 1-pulse mode controllable by the PWM mode, no continuity of the fundamental wave can be achieved.

Next, even when there exists such a period that the modulation stop periods are overlapped with each other in all phases, the PWM mode must be switched under such an overlapping condition.

Therefore, the switching phases are supervised. In FIGS. 22(f), (g), (h), there are shown voltages in the respective phases, from which it will be understood that, with θ being set to 0 as a reference, the modulation stop periods of all phases are overlapped at θ=α1 (not shown, but phase lower than the above 30°), and thereafter there are overlapped points every 70°.

The switching phase αc is set to:

$$\alpha1 \leq \alpha c < 60° - \alpha1.$$

As a consequence, continuity of the fundamental wave can be maintained.

Figure 23A:
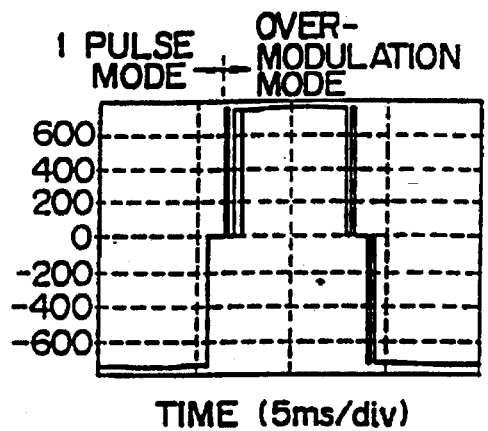
FIGS. 23A to 23F show waveforms appearing when the overmodulation/1-pulse transfer control is performed.
Figure 23B:
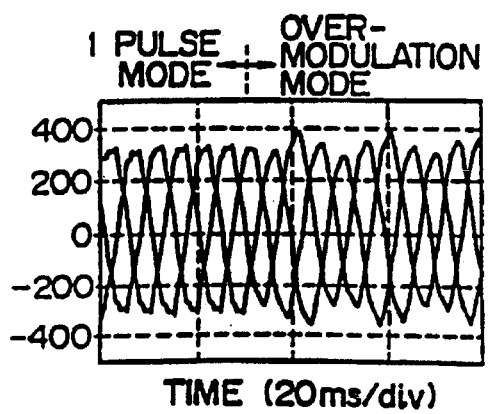
Figure 23C:
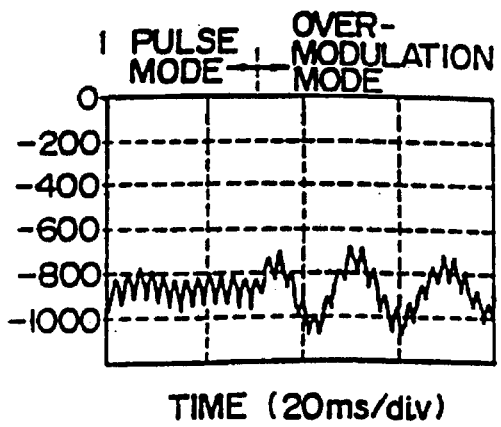
Figure 23D:
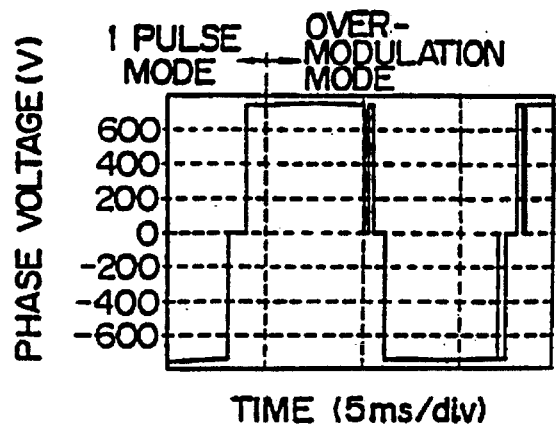
Figure 23E:
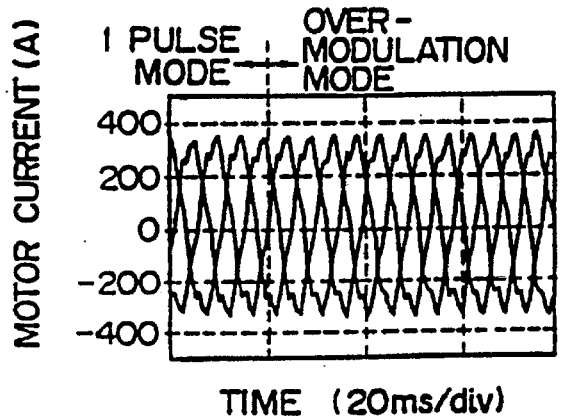
Figure 23F:
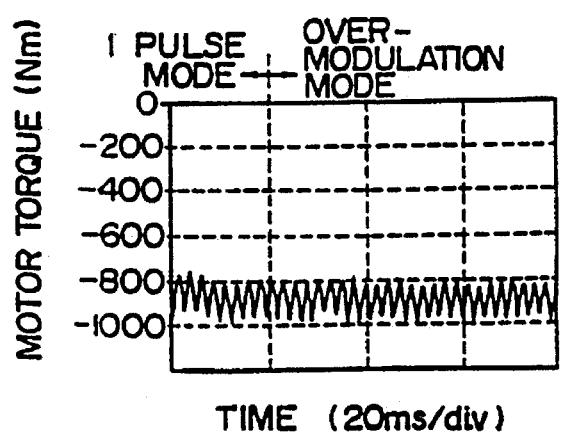

FIGS. 23A–23F shows an example of simulation waveforms appearing after the PWM mode has been changed from the 1-pulse mode into the overmodulation mode in the case that an induction motor is employed as the load. FIGS. 23A–23C show such a case that no case is taken into the switching voltage and the phase. FIGS. 23D–23F indicate such a case that the present embodiment is applied.

If the present embodiment would not be applied, the output current peak value would jump and the produced torque would be changed when the PWM mode is transferred. However, it can be seen that these variations are sufficiently lowered when this preferred embodiment would be applied.

Figure 21:
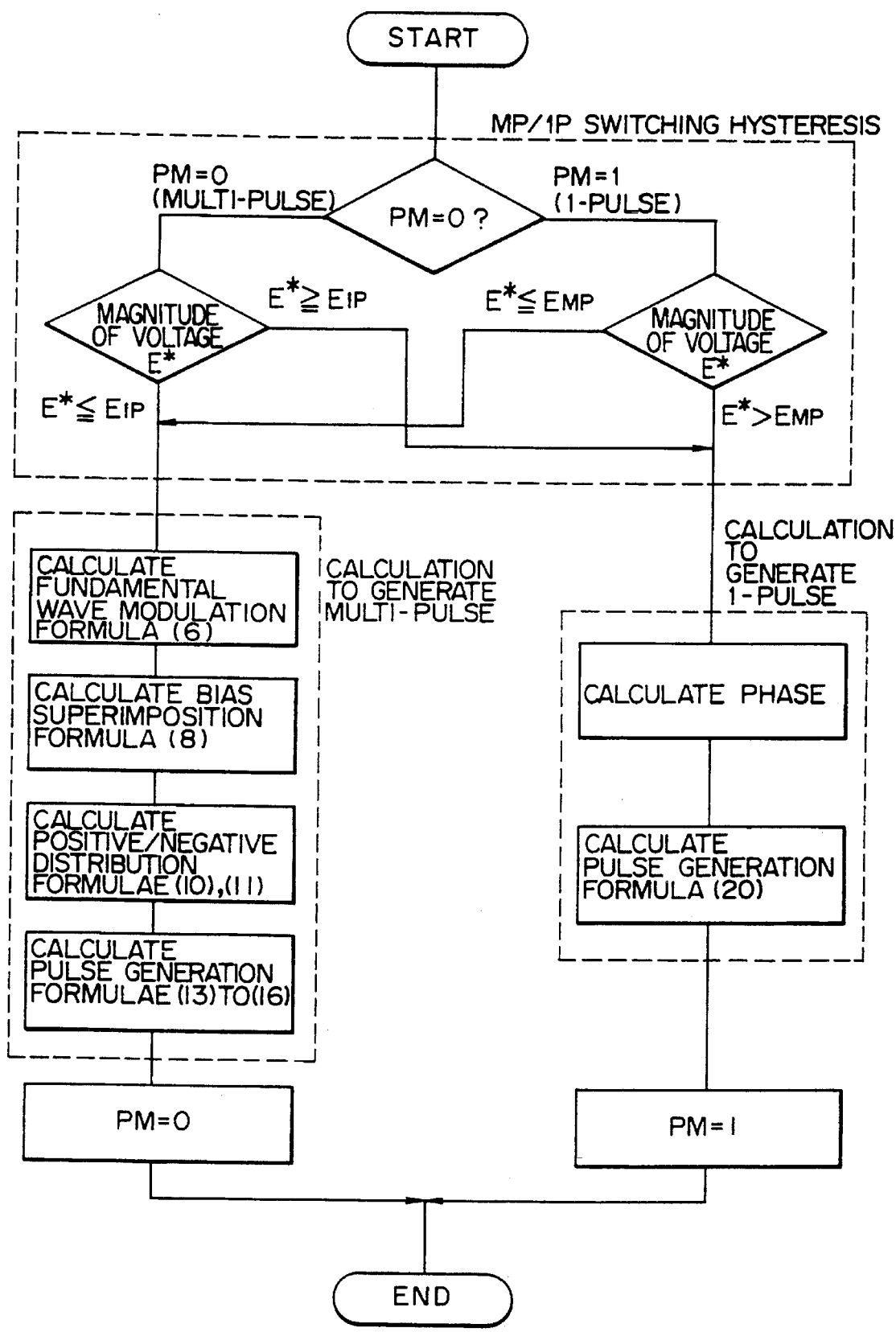
FIG. 21 is a flow chart of operation of pulse width modulating means by way of software.

When a microprocessor is employed, either a portion, or all portions, of the above-described pulse width modulation means may be programmed and be realized in a software manner. In FIG. 21, there is shown an example of a flow chart for explaining that the rising/falling timings are calculated in the pulse width modulation means shown in FIG. 4 under control of the software.

Although all of the above-described preferred embodiments employ an induction motor, the present invention is not limited thereto, but may be similarly applied to other AC motors while realizing similar merits. Also, all of the above descriptions have been made of the inverters. The output terminals of these inverters are connected via a reactance element to an AC power supply, which may be operated as a self-exciting converter for converting AC into DC. Also in this case, a similar effect to that of the inverter can be achieved.

It should be noted that although the above descriptions were made of the 3-level inverter, the inventive idea of this invention may be similarly applied to multi-level inverters other than the 3-level inverter.

In accordance with the present invention, the output voltage of the inverter may be smoothly and continuously adjusted from zero voltage to the maximum voltage. Moreover, the pulse generation controlling system can be simplified.

In addition, when this inventive idea is applied to an electric vehicle, such an electric vehicle with low noise may be provided.

We claim:

1. An electric power converting apparatus for converting a DC voltage into AC phase voltages having 3-leveled potentials, for driving an AC motor, said electric power converting apparatus comprising:

first means for receiving the DC voltage and producing therefrom an AC voltage in a unipolar modulation mode, to produce a series of output pulses such that each half period of the fundamental wave of an output AC voltage of said electric power converting apparatus is represented by a series of single polarity pulses;

second means for receiving the DC voltage and producing therefrom an AC voltage in an overmodulation mode, to produce a series of output pulses such that each half period of the fundamental wave of the output AC voltage of said electric power converting apparatus is represented by a series of single polarity pulses filled up in the center by a plurality of pulses of the single polarity;

third means for receiving the DC voltage and producing therefrom an AC voltage in a 1-pulse mode, to produce an output pulse such that a half period of the fundamental wave of the output AC voltage of said electric power converting apparatus is represented by a single pulse having the same polarity as said half period; and output means for switching among said first, second, and third, means to change the modulation mode among the unipolar modulation mode, the overmodulation mode, and the 1-pulse mode.

* * * * *